(12) United States Patent
Kido

(10) Patent No.: US 6,310,665 B1
(45) Date of Patent: Oct. 30, 2001

(54) LIQUID CRYSTAL DISPLAY APPARATUS AND OPTICAL ADDRESSING DEVICE

(75) Inventor: Masami Kido, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/472,939

(22) Filed: Dec. 28, 1999

(51) Int. Cl.[7] .................. G02F 1/133; G02F 1/135; G02F 1/1333; G09G 3/10
(52) U.S. Cl. ..................... 349/32; 349/24; 349/84; 345/37
(58) Field of Search ................ 349/32, 24, 42, 349/84; 345/37, 90

(56) References Cited

U.S. PATENT DOCUMENTS

| | | | |
|---|---|---|---|
| 5,020,881 | * 6/1991 | Matsuda et al. | 350/333 |
| 5,430,462 | * 7/1995 | Katagiri et al. | 345/104 |
| 5,800,232 | * 9/1998 | Miyazaki | 445/24 |
| 6,122,022 | * 9/2000 | Hayakawa | 349/32 |
| 6,137,550 | * 10/2000 | Hinchliffe et al. | 349/32 |
| 6,233,028 | * 5/2001 | Bruinink et al. | 349/32 |

* cited by examiner

Primary Examiner—William L. Sikes
Assistant Examiner—Tarifur R. Chowdhury
(74) Attorney, Agent, or Firm—Nixon & Vanderhye, P.C.

(57) ABSTRACT

The liquid crystal display apparatus of the present invention includes: a first substrate; a second substrate; a liquid crystal layer sandwiched by the first substrate and the second substrate,; a first electrode layer formed on a surface of the first substrate facing the liquid crystal layer; a second electrode layer formed on a surface of the second substrate facing the liquid crystal layer; a third electrode layer electrically connected with the second electrode layer via a photoconductive layer; and a plurality of stripe-shaped light sources disposed outside the second substrate for irradiating at least a portion of the photoconductive layer with light, wherein the electrical conductivity of the photoconductive layer is changed by switching the plurality of light sources to switch electrical connection between the second electrode layer and the third electrode layer and thereby to realize optical addressing of the liquid crystal layer.

21 Claims, 33 Drawing Sheets

(a) 416

ITO formation and etching into stripes (b) 415

TiO₂ Formation (c) 414

Non-formation region

LIQUID CRYSTAL DISPLAY APPARATUS AND OPTICAL ADDRESSING DEVICE

BACKGROUND OF THE INVENTION

The present invention relates to an optical addressing device used for a display apparatus which utilizes an electrooptic material, and a display apparatus using such an optical addressing device. More specifically, the present invention relates to an optical addressing device suitably used for a liquid crystal display apparatus, and a liquid crystal display apparatus using such an optical addressing device.

Liquid crystal display apparatuses are classified based on the driving method thereof into types of an electrical addressing method, a thermal addressing method, and an optical addressing method. Among these types, presently, a passive matrix (PM) type and an active matrix (AM) type of the electrical addressing method are most frequently used as direct-view display apparatuses.

In recent years, needs for a larger size and a higher precision of a display apparatus has increased. Conventional types of liquid crystal display apparatuses however have not satisfactorily responded to these needs. In reality, the largest size of 20 inches diagonally is the limit for products commercially available. Even for trial manufacture, the size is only about 30 inches diagonally. In particular, the PM type has a problem that the contrast is lowered due to crosstalk as the number of pixels increases. The AM type also has a problem that it is difficult to form a number of switching elements (especially, thin film transistors (TFTs)) without occurrence of defects.

A plasma addressed liquid crystal (PALC) display apparatus was developed in 1990 by T. Buzak and his colleagues of Tektronix Inc., U.S. as an AM type liquid crystal display apparatus which does not use semiconductor switching elements such as TFTs (see U.S. Pat. No. 4,896,149 and the corresponding Japanese Laid-Open Publication No. 1-217396, for example). The sectional structure of such a PALC apparatus is diagrammatically shown in FIG. 1.

A PALC display apparatus 100 has a layered structure consisting of a liquid crystal cell and a plasma cell. A liquid crystal layer 103 is sandwiched by a substrate 101 and a dielectric separator 104 and driven by a potential difference between signal electrodes (column electrodes) 102 and the dielectric separator 104. The plasma cell has a plurality of plasma discharge channels 105 formed by dividing a space between a substrate 109 and the dielectric separator 104 with a plurality of rib walls 106. Each plasma discharge channel 105 encloses ionizable gas therein so as to allow plasma to be generated by applying a discharge pulse voltage between a cathode 107 and an anode 108. The plurality of plasma discharge channels 105 extend in the direction perpendicular to the length of the signal electrodes (column electrodes) 102, and the cathodes 107 and the anodes 108 serve as scanning electrodes (row electrodes) 110, thus to effect line-sequential scanning.

In the PALC display apparatus described above, the size can be increased comparatively easily compared with a TFT-incorporated liquid crystal display apparatus. However, the PALC display apparatus has problems as follows. The dielectric separator 104 of the PALC display apparatus 100 is made of a glass thin plate, which is not only expensive but also difficult in handling. In fact, handling of such a glass thin plate becomes more difficult as the size of the display apparatus is larger, increasing the probability of fracture during fabrication of the display apparatus.

The surface of the glass thin plate on the plasma cell side serves as a pseudo-electrode during the driving of the PALC display apparatus. The thickness of the glass thin plate is about 50 to 100 microns, which is larger by ten times or more than that of a general nematic liquid crystal layer, i.e., 3 to 6 microns. In order to drive the PALC display apparatus, therefore, it is required to apply a voltage higher by ten times or more than a voltage with which the liquid crystal layer can be effectively driven. This causes problems such as increasing the burden on a drive circuit and increasing power consumption accompanied by heat generation.

Moreover, since the glass thin plate is fragile in strength, it is very difficult to form an electrode thereon. This is the reason why the electrodes for plasma discharge are formed in parallel with the plane of the substrate as shown in FIG. 1. This construction is not desirable since it reduces the aperture ratio of the display apparatus and thus lowers display quality.

SUMMARY OF THE INVENTION

An object of the present invention is providing an optical addressing device which can be fabricated at low cost and high yield and is suitable for realization of size increase and high precision, and a liquid crystal display apparatus using such an optical addressing device.

The liquid crystal display apparatus of the present invention includes: a first substrate; a second substrate; a liquid crystal layer sandwiched by the first substrate and the second substrate; a first electrode layer formed on a surface of the first substrate facing the liquid crystal layer; a second electrode layer formed on a surface of the second substrate facing the liquid crystal layer; a third electrode layer electrically connected with the second electrode layer via a photoconductive layer; and a plurality of stripe-shaped light sources disposed outside the second substrate for irradiating at least a portion of the photoconductive layer with light, wherein the electrical conductivity of the photoconductive layer is changed by switching the plurality of light sources to switch electrical connection between the second electrode layer and the third electrode layer and thereby to realize optical addressing of the liquid crystal layer.

In one embodiment, the first electrode layer comprises a single first electrode, the second electrode layer, the photoconductive layer, and the third electrode layer are formed on the surface of the second substrate facing the liquid crystal layer in this order, the second electrode layer comprises a plurality of pixel electrodes arranged in a matrix, the third electrode layer comprises a plurality of signal electrodes extending in parallel with one another in a first direction, and the plurality of light sources are stripe-shaped light sources extending in parallel with one another in a second direction which is different from the first direction.

In another embodiment, the photoconductive layer comprises at least one dot-shaped photoconductive film arranged for each of the plurality of pixel electrodes.

In still another embodiment, the liquid crystal display apparatus further includes a storage capacitor electrically connected with each of the pixel electrodes.

In still another embodiment, the first electrode comprises a transparent conductive layer, the first electrode further comprising a metal electrode electrically connected with the transparent conductive layer.

In still another embodiment, the photoconductive layer includes a substance of which electrical conductivity changes in response to ultraviolet to allow for display in a transmission mode or a reflection mode.

In still another embodiment, the photoconductive layer includes a substance of which electrical conductivity changes in response to visible light to allow for display in a transmission mode or a reflection mode.

In still another embodiment, the photoconductive layer comprises a single photoconductive film.

In still another embodiment, the photoconductive layer comprises a plurality of stripe-shaped photoconductive films extending in parallel with the plurality of stripe-shaped signal electrodes.

In still another embodiment, the plurality of light sources comprise plasma light-emitting channels enclosing ionizable gas therein.

In still another embodiment, the plurality of light sources further include a phosphor which changes ultraviolet emitted from the plasma light-emitting channels to visible light.

In still another embodiment, the first electrode layer comprises a plurality of stripe-shaped first electrodes extending in parallel with one another in a first direction, the second electrode layer, the photoconductive layer, and the third electrode layer are formed on the surface of the second substrate facing the liquid crystal layer in this order, the second electrode layer comprises a plurality of pixel electrodes arranged in a matrix, or a plurality of stripe-shaped second electrodes extending in parallel with one another in a second direction which is different from the first direction, the third electrode layer comprises a plurality of stripe-shaped signal electrodes extending in parallel with one another in the second direction, and the plurality of light sources are stripe-shaped light sources extending in parallel with one another in the second direction.

In still another embodiment, the photoconductive layer comprises at least one dot-shaped photoconductive film arranged for each of the plurality of pixel electrodes.

In still another embodiment, the liquid crystal display apparatus further includes a storage capacitor electrically connected with each of the pixel electrodes.

In still another embodiment, the first electrode comprises a transparent conductive layer, the first electrode further comprising a metal electrode electrically connected with the transparent conductive layer.

In still another embodiment, the photoconductive layer includes a substance of which electrical conductivity changes in response to ultraviolet to allow for display in a transmission mode or a reflection mode.

In still another embodiment, the photoconductive layer includes a substance of which electrical conductivity changes in response to visible light to allow for display in a transmission mode or a reflection mode.

In still another embodiment, the photoconductive layer comprises a single photoconductive film.

In still another embodiment, the photoconductive layer comprises a plurality of stripe-shaped photoconductive films extending in parallel with the plurality of stripe-shaped signal electrodes.

In still another embodiment, the plurality of light sources comprise plasma light-emitting channels enclosing ionizable gas therein.

In still another embodiment of the invention, the plurality of light sources further include a phosphor which changes ultraviolet emitted from the plasma light-emitting channels to visible light.

Alternatively, the liquid crystal display apparatus of this invention includes: a first substrate; a second substrate; a liquid crystal layer sandwiched by the first substrate and the second substrate; a single first electrode formed on a surface of the first substrate facing the liquid crystal layer; a plurality of stripe-shaped signal electrodes formed of either a metal material or a transparent conductive material on a surface of the second substrate facing the liquid crystal layer, the signal electrodes extending in parallel with one another in a first direction; a photoconductive layer covering the plurality of signal electrodes; and a plurality of stripe-shaped light sources disposed outside the second substrate for irradiating at least a portion of the photoconductive layer with light, the light sources extending in parallel with one another in a second direction which is different from the first direction, wherein the electrical conductivity of the photoconductive layer is changed by switching the plurality of light sources to switch electrical connection between the irradiated region of the photoconductive layer and the corresponding signal electrode and thereby to realize optical addressing of the liquid crystal layer.

Alternatively, the liquid crystal display apparatus of this invention includes: a first substrate; a second substrate; a liquid crystal layer sandwiched by the first substrate and the second substrate; a plurality of stripe-shaped first electrodes formed on a surface of the first substrate facing the liquid crystal layer, the first electrodes extending in parallel with one another in a first direction; a plurality of stripe-shaped signal electrodes formed of either a metal material or a transparent conductive material on a surface of the second substrate facing the liquid crystal layer, the signal electrodes extending in parallel with one another in a second direction which is different from the first direction; a photoconductive layer covering the plurality of signal electrodes; and a plurality of stripe-shaped light sources disposed outside the second substrate for irradiating at least a portion of the photoconductive layer with light, the light sources extending in parallel with one another in the second direction, wherein the electrical conductivity of the photoconductive layer is changed by switching the plurality of light sources to switch electrical connection between the irradiated region of the photoconductive layer and the corresponding signal electrode and thereby to realize optical addressing of the liquid crystal layer.

Alternatively, the liquid crystal display apparatus of this invention includes: a first substrate; a second substrate; a liquid crystal layer sandwiched by the first substrate and the second substrate; a single first electrode formed on a surface of the first substrate facing the liquid crystal layer; a plurality of stripe-shaped signal electrodes formed of a transparent conductive material on a surface of the second substrate facing the liquid crystal layer, the signal electrodes extending in parallel with one another in a first direction; an insulating layer formed on the plurality of signal electrodes; a photoconductive layer formed between the plurality of signal electrodes and the insulating layer; a plurality of pixel electrodes connected with the photoconductive layer via through holes formed through the insulating layer; and a plurality of stripe-shaped light sources disposed outside the second substrate for irradiating at least a portion of the photoconductive layer with light, the light sources extending in parallel with one another in a second direction which is different from the first direction, wherein the electrical conductivity of the photoconductive layer is changed by switching the plurality of light sources to switch electrical connection between the pixel electrodes and the signal electrodes and thereby to realize optical addressing of the liquid crystal layer.

In one embodiment, the photoconductive layer comprises at least one dot-shaped photoconductive film arranged for each of the plurality of pixel electrodes.

In another embodiment, the liquid crystal display apparatus further includes a storage capacitor electrically connected to each of the pixel electrodes.

In still another embodiment, the first electrode comprises a transparent conductive layer, the first electrode further comprising a metal electrode electrically connected with the transparent conductive layer.

In still another embodiment, the photoconductive layer includes a substance of which electrical conductivity changes in response to ultraviolet to allow for display in a transmission mode or a reflection mode.

In still another embodiment, the photoconductive layer includes a substance of which electrical conductivity changes in response to visible light to allow for display in a transmission mode or a reflection mode.

In still another embodiment, the photoconductive layer comprises a single photoconductive film.

In still another embodiment, the photoconductive layer comprises a plurality of stripe-shaped photoconductive films extending in parallel with the plurality of stripe-shaped signal electrodes.

In still another embodiment, the plurality of light sources comprise plasma light-emitting channels enclosing ionizable gas therein.

In still another embodiment, the plurality of light sources further include a phosphor which changes ultraviolet emitted from the plasma light-emitting channels to visible light.

Alternatively, the liquid crystal display apparatus of this invention includes: a first substrate; a second substrate; a liquid crystal layer sandwiched by the first substrate and the second substrate; a plurality of stripe-shaped first electrodes formed on a surface of the first substrate facing the liquid crystal layer, the first electrodes extending in parallel with one another in a first direction; a plurality of stripe-shaped signal electrodes formed of a transparent conductive material on a surface of the second substrate facing the liquid crystal layer, the signal electrodes extending in parallel with one another in a second direction which is different from the first direction; an insulating layer formed on the plurality of signal electrodes; a photoconductive layer formed between the plurality of signal electrodes and the insulating layer; a plurality of pixel electrodes connected with the photoconductive layer via through holes formed through the insulating layer; a plurality of stripe-shaped light sources disposed outside the second substrate for irradiating at least a portion of the photoconductive layer with light, the light sources extending in parallel with one another in the second direction, wherein the electrical conductivity of the photoconductive layer is changed by switching the plurality of light sources to switch electrical connection between the irradiated region of the photoconductive layer and the corresponding signal electrode and thereby to realize optical addressing of the liquid crystal layer.

In one embodiment, the photoconductive layer comprises at least one dot-shaped photoconductive film arranged for each of the plurality of pixel electrodes.

In another embodiment, the liquid crystal display apparatus of this invention further includes a storage capacitor electrically connected with each of the pixel electrodes.

In still another embodiment, the first electrode comprises a transparent conductive layer, the first electrode further comprising a metal electrode electrically connected with the transparent conductive layer.

In still another embodiment, the photoconductive layer includes a substance of which electrical conductivity changes in response to ultraviolet to allow for display in a transmission mode or a reflection mode.

In still another embodiment, the photoconductive layer includes a substance of which electrical conductivity changes in response to visible light to allow for display in a transmission mode or a reflection mode.

In still another embodiment, the photoconductive layer comprises a single photoconductive film.

In still another embodiment, the photoconductive layer comprises a plurality of stripe-shaped photoconductive films extending in parallel with the plurality of stripe-shaped signal electrodes.

In still another embodiment, the plurality of light sources comprise plasma light-emitting channels enclosing ionizable gas therein.

In still another embodiment, the plurality of light sources further include a phosphor which changes ultraviolet emitted from the plasma light-emitting channels to visible light.

According to another aspect of the invention, an optical addressing device comprising a plurality of plasma light-emitting channels is provided. The plasma light-emitting channels includes: a first substrate; a second substrate facing the first substrate; rib walls formed between the first substrate and the second substrate; and ionizable gas enclosed in spaces defined by the first substrate, the second substrate, and the rib walls. A first electrode and a second electrode are formed on the surfaces of the first and second substrates facing each other, respectively, and light emitted from the plasma light-emitting channels is transmitted through the first substrate and the first electrode to be output.

In one embodiment, the first electrode comprises a single transparent electrode common for the plurality of plasma light-emitting channels.

In another embodiment, the first electrode comprises stripe-shaped transparent electrodes formed for the respective plasma light-emitting channels.

In still another embodiment, the optical addressing device further includes a metal electrode connected with the first electrode.

In still another embodiment, at least a portion of the metal electrode is formed so as to overlap the rib walls when viewed from a position normal to the first substrate.

Alternatively, the optical addressing device of this invention includes a plurality of plasma light-emitting channels. The plasma light-emitting channels includes: a first substrate; a second substrate facing the first substrate; rib walls formed between the first substrate and the second substrate; and ionizable gas enclosed in spaces defined by the first substrate, the second substrate, and the rib walls. A first electrode and a second electrode are formed on the surfaces of the first and second substrates facing each other, respectively, the first and second electrodes being stripe-shaped electrodes extending in parallel with each other, and at least a portion of the first electrode is formed so as to overlap the rib walls when viewed from a position normal to the first substrate.

Alternatively, the liquid crystal display apparatus of this invention includes: a third substrate; a fourth substrate; a liquid crystal layer sandwiched by the third substrate and the fourth substrate; an electrode layer formed on a surface of the third substrate facing the liquid crystal layer; a plurality of pixel electrodes arranged in a matrix on a surface of the fourth substrate facing the liquid crystal layer; a plurality of stripe-shaped signal electrodes extending in parallel with one another, the signal electrodes being electrically connected with the plurality of pixel electrodes via a photoconductive layer; and the optical addressing device described above disposed outside the fourth electrode for irradiating at least a portion of the photoconductive layer with light, wherein the electrical conductivity of the photoconductive layer is changed by switching the light from the optical addressing device to switch electrical connection between the pixel electrodes and the signal electrodes and thereby to realize optical addressing of the liquid crystal layer.

In one embodiment:, the optical addressing device further comprises a metal electrode connected with the first electrode, a black matrix is formed on the third or fourth substrate, and at least a portion of the metal electrode is formed so as to overlap the black matrix and/or outside a display region when viewed from a position normal to the first substrate.

Thus, a liquid crystal display apparatus according to the present invention includes: signal electrodes electrically connected with pixel electrodes (or stripe-shaped electrodes) via a photoconductive layer; and a plurality of stripe-shaped light sources which emit light to irradiate the photoconductive layer. By selectively irradiating the photoconductive layer with light, the pixel electrodes connected with the signal electrodes can be selected sequentially (e.g., line-sequentially for rows). As a result, a liquid crystal layer can be scanned line-sequentially with a voltage applied between a counter electrode (e.g., column electrodes) and the pixel electrodes by switching the stripe-shaped light sources. In other words, the liquid crystal layer can be optically addressed. The arrangement of the electrodes, the photoconductive layer, and the light sources for applying a voltage to the liquid crystal layer can be selected from a variety of possibilities.

Each of the "strip-shaped light sources" formed in the liquid crystal display apparatus according to the present invention is a linear light source (including a rectangular light source) provided every row or column of a pixel region composed of pixels in a matrix (rows×columns) of the display apparatus, where ON (emitting)/OFF (non-emitting) of the light source is switched integrally for each row or column. Typically, the stripe-shaped light source refers to a light source of which light emitting section itself is of a stripe shape. The stripe-shaped light source as used herein does not include a light source in which light emitted from a point light source is introduced to a stripe-shaped waveguide to be output from a stripe-shaped region. This is because light emitted from a point light source decreases in luminous energy while propagating in the waveguide, failing to provide uniform display in some cases.

The liquid crystal display apparatus according to the present invention includes the stripe-shaped light sources described above. Accordingly, linearly uniform light emission can be obtained with a simple construction. By this light emission, the matrix-shaped pixel region of the display apparatus can be addressed every row or column of the matrix. Further, since this light emission is used only for changing the electrical conductivity of the photoconductive layer, not for display, the intensity and duration of the light emission are not required to be changed, but can be fixed. Therefore, a drive circuit for driving the light sources can be simple in structure.

The stripe-shaped light sources of the liquid crystal display apparatus according to the present invention may have a construction similar to that used for the plasma cell of the PALC display apparatus described above, for example. In the conventional PALC display apparatus, the plasma discharge channels 105 are required to be electrically coupled with the liquid crystal layer 103 via the dielectric separator 104. In order to accomplish this, the dielectric separator 104 must be a very thin glass sheet. On the contrary, the plasma cell as the light sources for the liquid crystal display apparatus according to the present invention is just required to provide only a level of light necessary to fully change the electrical conductivity of the photoconductive layer. Therefore, the thickness of the substrate disposed between the plasma light-emitting section and the photoconductive layer is not limited if the intensity of the light and the sensitivity of the photoconductive layer are at adequate levels. Therefore, the thickness can be designed appropriately in consideration of handling and the like during the fabrication process. The stripe-shaped light sources of the liquid crystal display apparatus according to the present invention can be driven with basically the same circuit as a drive circuit for driving the plasma cell of the PALC display apparatus.

Another liquid crystal display apparatus according to the present invention includes signal electrodes, a photoconductive layer covering the signal electrodes, and a plurality of stripe-shaped light sources for emitting light to irradiate the photoconductive layer. By selectively irradiating the photoconductive layer with light, regions of the photoconductive layer electrically connected with the signal electrodes can be selected sequentially (e.g., line-sequentially for columns). As a result, a liquid crystal layer can be scanned line-sequentially with a voltage applied between the selected regions of the photoconductive layer and a counter electrode by switching the stripe-shaped light sources. In other words, the liquid crystal layer can be optically addressed.

For example, when the photoconductive layer formed on the plurality of stripe-shaped signal electrodes extending in the row direction is irradiated with light in the shape of a stripe extending in the column direction (perpendicular to the row direction), the area at which the irradiated region and the signal electrode crosses each other is selected (i.e., applied with a predetermined voltage). This results in applying a predetermined voltage to a domain of the liquid crystal layer located between the counter electrode and the region of the photoconductive layer irradiated with light. By arranging the stripe-shaped signal electrodes and the stripe-shaped light sources to be perpendicular to each other, a single counter electrode can be used.

When the photoconductive layer formed on the plurality of stripe-shaped signal electrodes extending in the row direction is irradiated with light in the shape of a stripe extending in parallel with the signal electrodes, every row of the photoconductive layer is selected (i.e., applied with a predetermined voltage). In this case, by forming a plurality of stripe-shaped electrodes (scanning electrodes) extending in the column direction on a counter substrate, a predetermined voltage is applied to a domain of the liquid crystal layer located at the crossing of the scanning electrode and the signal electrode.

In an optical addressing device according to the present invention, one of discharge electrodes of each plasma light-emitting channel is a transparent electrode which is formed over the entire surface of the plasma light-emitting channel. This suppresses lowering of the aperture ratio due to existence of the discharge electrodes. Another optical addressing device according to the present invention uses a pair of stripe-shaped discharge electrodes. At least a portion of the discharge electrodes is formed so as to overlap a rib wall or a black mask or outside a display region, thereby minimizing lowering of the aperture ratio due to existence of the discharge electrodes.

Yet another liquid crystal display apparatus according to the present invention includes signal electrodes electrically connected with pixel electrodes (or stripe-shaped electrodes) via a photoconductive layer and a plurality of stripe-shaped light sources which emit light to irradiate the photoconductive layer. By selectively irradiating the photoconductive layer with light, the pixel electrodes connected with the signal electrodes can be selected sequentially (e.g., line-sequentially for rows). As a result, a liquid crystal layer can be scanned line-sequentially with a voltage applied between a counter electrode (e.g., column electrodes) and the pixel electrodes by switching the light sources. In other words, the liquid crystal layer can be optical-addressed. The arrangement of the electrodes, the photoconductive layer, and the light sources for applying a voltage to the liquid crystal layer can be selected from a variety of possibilities.

DESCRIPTION OF THE PREFERRED EMBODIMENTS

Hereinafter, preferred embodiments of the present invention will be described with reference to the accompanying drawings.

Embodiment 1

Figure 1:
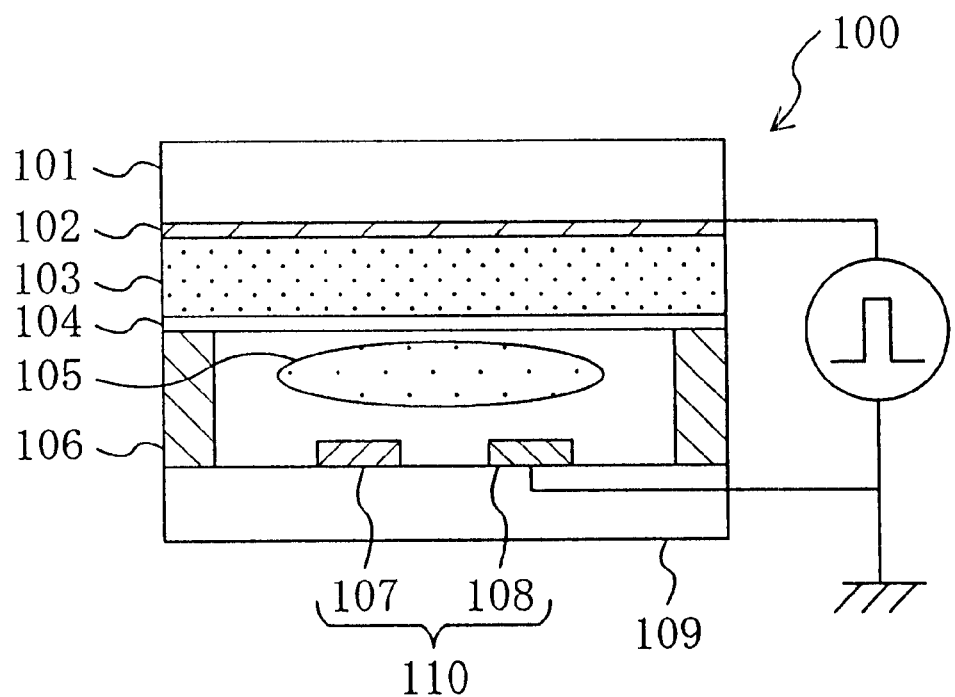
FIG. 1 is a cross-sectional view diagrammatically illustrating a conventional PALC display apparatus.
Figure 2:
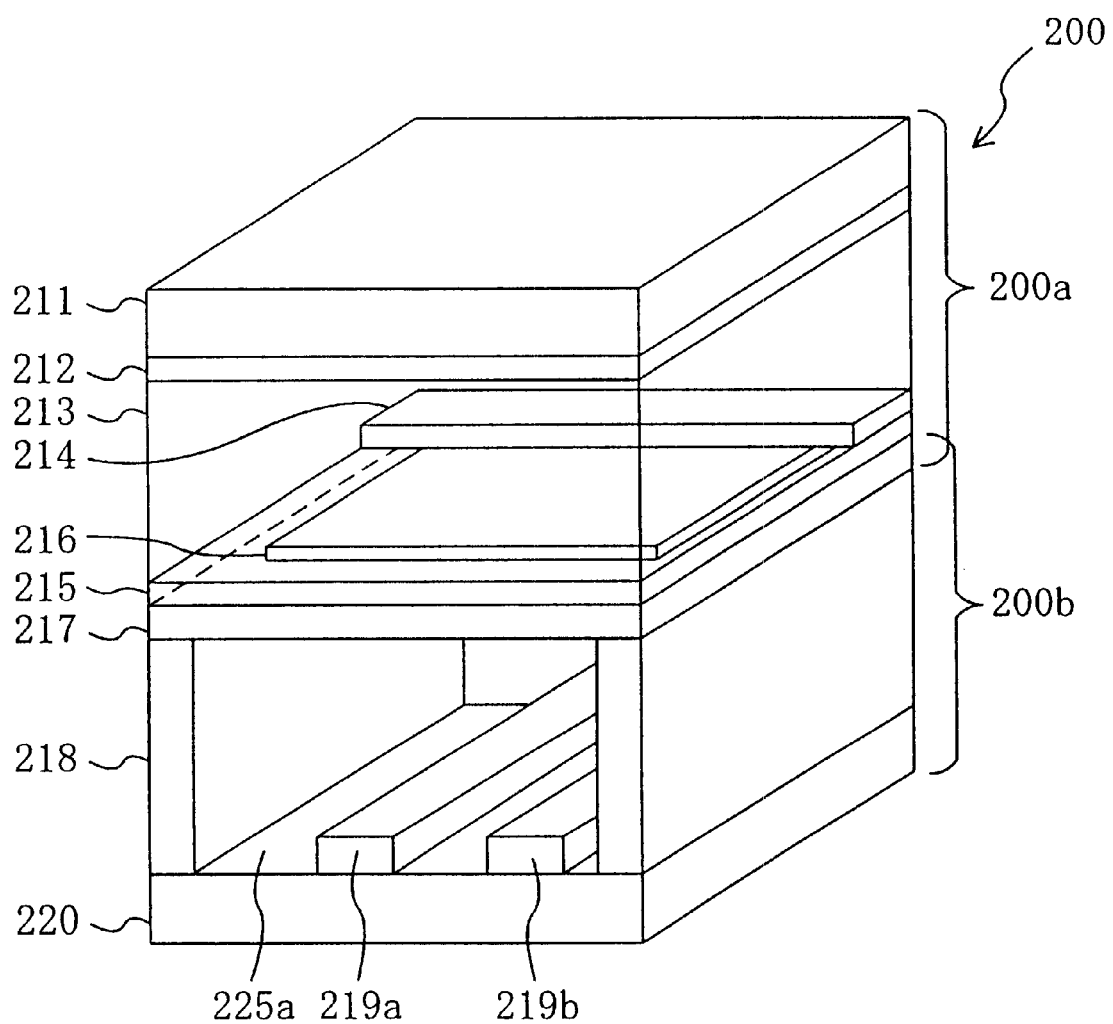
FIG. 2 is a view diagrammatically illustrating a liquid crystal display apparatus according to the present invention.

A liquid crystal display (LCD) apparatus 200 of this embodiment is diagrammatically shown in FIG. 2. The LCD apparatus 200 includes a liquid crystal cell 200a and a plasma light-emitting cell 200b, which share a substrate 217. The substrate 217 corresponds to the dielectric separator 104 of the conventional PALC display apparatus shown in FIG. 1.

The liquid crystal cell 200a includes a liquid crystal layer 213 between a substrate 211 (first substrate) and the substrate 217 (second substrate). A counter electrode 212 made of a transparent conductive material such as ITO (indium tin oxide) is formed on the surface of the substrate 211 facing the liquid crystal layer 213 over substantially the entire display region. A color filter may also be formed as required.

A plurality of pixel electrodes 216, a photoconductive layer 215 covering the pixel electrodes 216, and a plurality of stripe-shaped signal electrodes 214 are formed on the surface of the substrate 217 facing the liquid crystal layer 213. The photoconductive layer 215 is formed over substantially the entire display region. In the case of a transmission type LCD apparatus using ultraviolet as addressing light, it is desirable to extend each signal electrode 214 slightly outside a periphery of the corresponding pixel electrode 216, since the material of the pixel electrodes 216 has a low ultraviolet transmittance.

The liquid crystal layer 213 can be formed of a liquid crystal material used for conventional active matrix LCD apparatuses, such as nematic liquid crystal and cholesteric liquid crystal. Alignment films (not shown) may also be formed on the surfaces of the substrates 211 and 217 facing the liquid crystal layer 213 as required.

The plasma light-emitting cell 200b has a plurality of plasma light-emitting channels 225a formed by dividing a space between the substrate 217 and a substrate 220 with a plurality of rib wells 218. Each plasma light-emitting channel 225a encloses ionizable gas therein and generates plasma by application of a discharge pulse voltage between a cathode 219a and an anode 219b. The plasma light-emitting channels 225a extend in the direction perpendicular to the length of the signal electrodes 214 (Type I). By controlling ON/OFF of the plasma light-emitting channels 225a, therefore, the pixel electrodes 216 electrically connected with the signal electrodes 214 can be scanned line-sequentially. In this construction where the pixel electrodes 216 located at the respective crossings of the signal electrodes 214 and the plasma light-emitting channels 225a are selected, the counter electrode 212 can be formed as a single electrode common for all the pixel electrodes 216.

The plasma light-emitting cell 200b may have substantially the same construction as the plasma cell of the PALC display apparatus. The plasma light-emitting channels 225a may be formed by etching a thick substrate, instead of providing the plurality of rib walls 218 on the substrate 220. The kind and pressure of the gas to be enclosed in the plasma light-emitting channels 225a may be optimized to enhance the luminous efficiency. For example, in the case of ultraviolet emission, helium, xenon, or a mixed gas thereof, for example, may be used. In the case of visible light emission, a mixed gas of neon and xenon or the like may be used, or an appropriate phosphor (fluorescent substance) may be applied to an inner wall of each plasma light-emitting channel 225a to change ultraviolet to visible light. Use of ultraviolet as addressing light is advantageous in that a transmission type LCD apparatus can be fabricated with a comparatively simple construction. An LCD apparatus using visible light as addressing light can be obtained by providing a structure for preventing light from a backlight and ambient light from entering the photoconductive layer.

In the LCD apparatus according to the present invention, no limitation is imposed on the material and thickness of the substrate 217 disposed between the liquid crystal cell 200a and the plasma light-emitting cell 200b if the intensity of light from the light source for optical addressing and the sensitivity of the photoconductive layer are at adequate levels. They can be appropriately determined in consideration of the yield during the fabrication process. A quartz substrate and a fused silica substrate, for example, may be used when ultraviolet is used. In the case of a large-screen display apparatus, the substrate 217 may be constructed of a plurality of substrates.

The material of the photoconductive layer 215 may be selected from known materials which fully change the electrical conductivity thereof in response to addressing light, in consideration of the wavelength and intensity of the addressing light and the construction of the apparatus. In the case of ultraviolet, titanium oxide ($TiO_2$), zinc oxide (ZnO), gallium nitride (GaN), and an organic photoconductor (OPC), for example, can be used. In the case of visible light, amorphous silicon, for example, can be used.

As a display apparatus utilizing plasma light emission, a so-called plasma display panel (PDP) is known. PDP is a self-emission type display apparatus where plasma-emitted ultraviolet is changed to visible light with a phosphor and the resultant visible light is used for display. On the contrary, the LCD apparatus according to the present invention utilizes light obtained by plasma light emission for addressing pixels. For display, light from a backlight is used in the case of a transmission type, and ambient light is used in the case of a reflection type, as in conventional LCD apparatuses. Therefore, the intensity of plasma light emission may only be in such a level that the electrical conductivity of the photoconductive layer can be fully changed. It is therefore possible to use comparatively weak light. For example, in the case of using plasma-emitted ultraviolet, since using emission lines is not required, the emission intensity can be optimized in consideration of the sensitivity of the photoconductive layer and the transmittance characteristics of the material of the substrate.

Figure 3A:
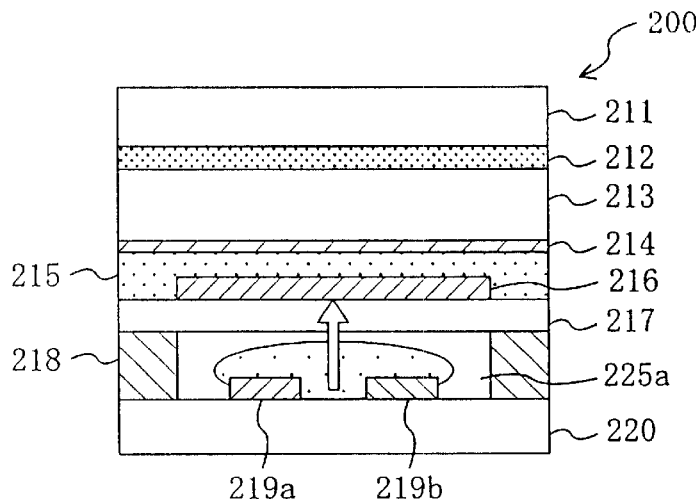
FIGS. 3A, 3B, and 3C are cross-sectional views for describing the operational principle of the liquid crystal display apparatus shown in FIG. 2 according to the present invention.
Figure 3B:
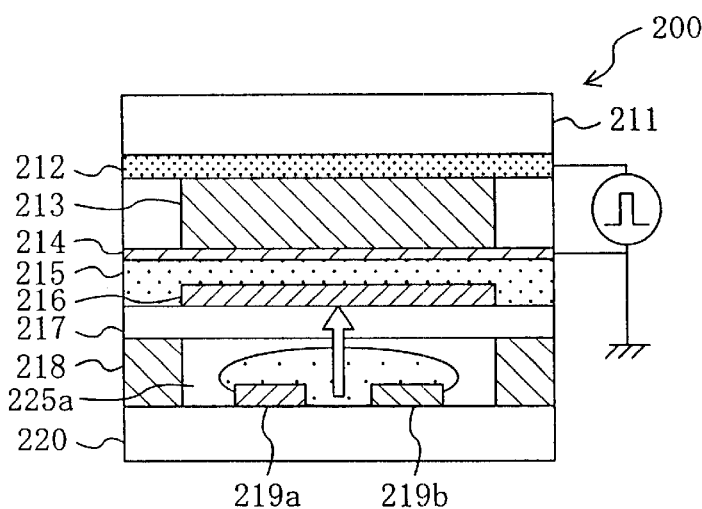
Figure 3C:
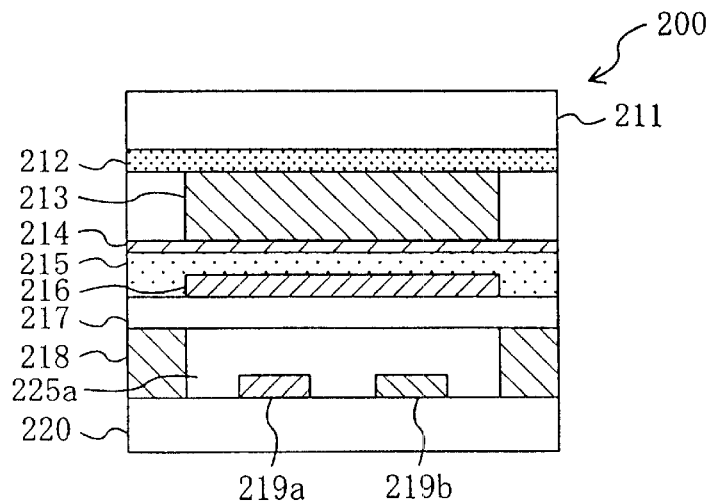

The operational principle of the LCD apparatus 200 of this embodiment will be described with reference to FIGS. 3A, 3B, and 3C. Gas enclosed in a selected plasma light-emitting channel 225a is ionized by applying a discharge pulse voltage between the cathode 219a and the anode 219b in the plasma light-emitting channel 225a, generating plasma. The generated plasma emits light of a wavelength which is different depending on the kind and pressure of the gas (FIG. 3A).

The emitted light passes through the substrate 217 (and the pixel electrodes 216) and irradiates the photoconductive layer 215. The electrical conductivity of the irradiated photoconductive layer 215 increases, allowing the photoconductive layer 215 to serve as a conductor for electrically connecting the signal electrode 214 and the pixel electrode 216. When a driving voltage is applied between the counter electrode 212 and the signal electrode 214 while the photoconductive layer 215 is in the conductive state, a voltage is applied to the domain of the liquid crystal layer 213 located between the pixel electrode 216 and the counter electrode 212 so as to drive the domain of the liquid crystal 213 which corresponds to one pixel (FIG. 3B).

When the application of a voltage between the cathode 219a and the anode 219b is terminated to stop plasma light emission, the electrical conductivity of the photoconductive layer 215 decreases, allowing the photoconductive layer 215 to become an insulator for electrically isolating the signal electrode 214 from the pixel electrode 216. Since the pixel electrode 216, the counter electrode 212, and the domain of the liquid crystal layer 213 between these electrodes serve as a capacitor, a charge corresponding to the driving voltage applied previously is retained on the pixel electrode 216, thereby retaining the driving state of the domain of the liquid crystal layer 213 (so-called sample hold state). In the state where plasma light emission stops (quenching state), the domain of the liquid crystal layer 213 on the pixel electrode 216 is not driven even when a driving voltage is applied between the counter electrode 212 and the signal electrode 214 since the pixel electrode 216 and the signal electrode 214 are electrically isolated from each other (FIG. 3C). The domain of the liquid crystal layer 213 is to be applied with the new driving voltage when the plasma light-emitting channel 225a is selected (when plasma light emission occurs) in the next frame (or field).

The LCD apparatus 200 of this embodiment can be fabricated by a method similar to those for the conventional plasma addressed liquid crystal (PALC) display apparatus and plasma display panel (PDP). An exemplified method for fabricating the LCD apparatus 200 of EMBODIMENT 1 will be described with reference to FIGS. 4A through 4C.

Figure 4A:
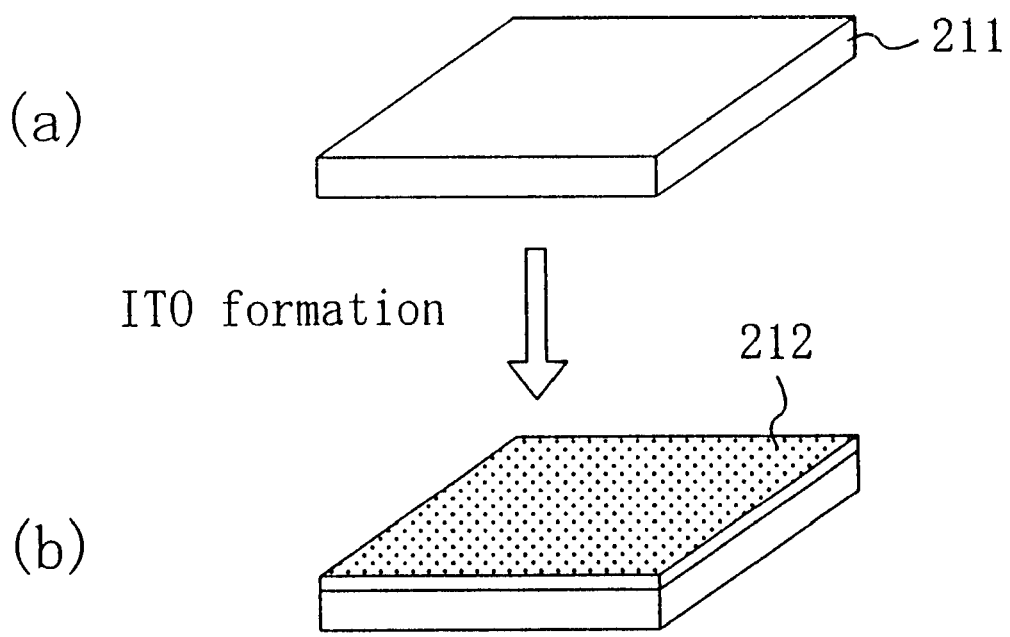
FIG. 4A is a schematic view illustrating steps (a) and (b) of a fabrication method of the liquid crystal display apparatus shown in FIG. 2 according to the present invention.

As shown by steps (a) and (b) of FIG. 4A, ITO is deposited to a thickness of about 50 nm on the glass substrate 211 having a thickness of about 1.1 mm by sputtering, for example, to form the counter electrode 212. An alignment film and a color filter may be formed as required.

Figure 4B:
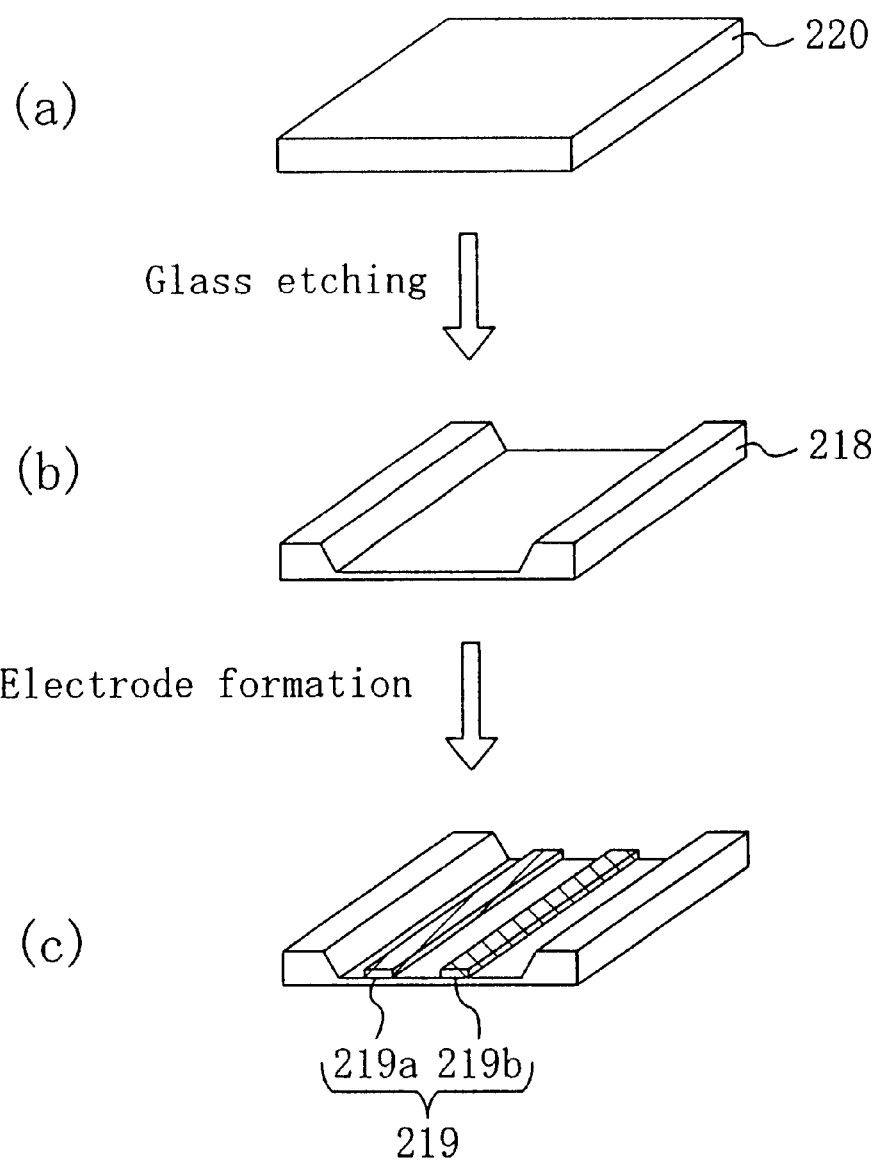
FIG. 4B is a schematic view illustrating steps (a), (b), and (c) of the fabrication method of the liquid crystal display apparatus shown in FIG. 2 according to the present invention.

As shown by steps (a), (b), and (c) of FIG. 4B, the glass substrate 220 having a thickness of about 1.1 mm is etched using hydrofluoric acid and the like, for example, to form the rib walls 218 having a height of about 200 μm. Alternatively, the rib walls 218 may be formed separately on the substrate 220 using glass frits, for example. The electrodes 219a and 219b for discharge can be formed by depositing a nickel film having a thickness of about 1 μm by sputtering and then etching the film.

Figure 4C:
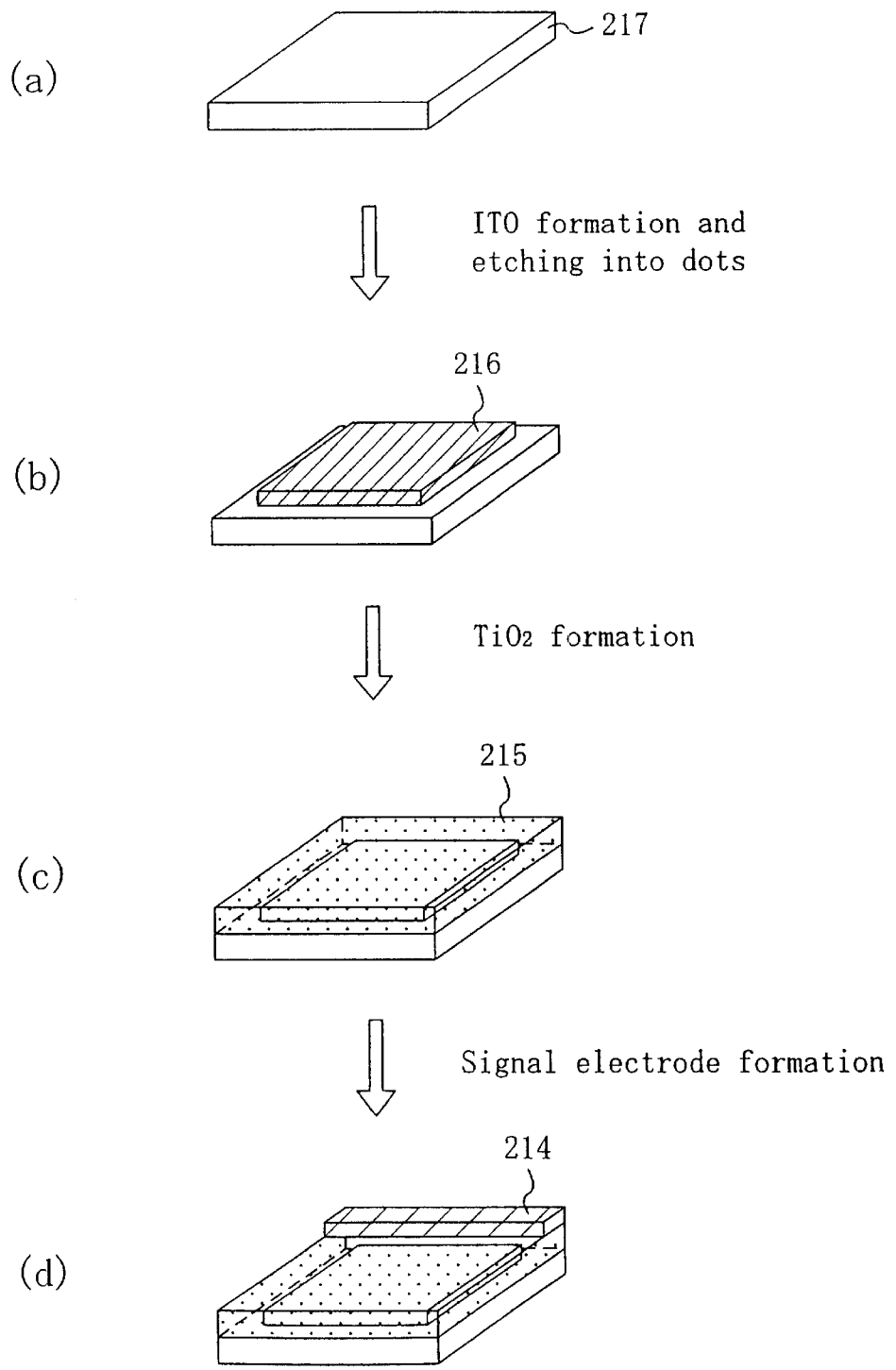
FIG. 4C is a schematic view illustrating steps (a), (b), (c), and (d) of the fabrication method of the liquid crystal display apparatus shown in FIG. 2 according to the present invention.

As shown by steps (a), (b), (c), and (d) of FIG. 4C, an ITO film having a thickness of about 50 nm is formed on the substrate 217 made of an ultraviolet transmissive material (e.g., a quartz substrate having a thickness of about 0.7 mm), and etched into a dot pattern of the pixel electrodes 216. A titanium oxide film having a thickness of about 0.1 μm is then formed by sputtering over substantially the entire surface of the resultant substrate, to form the photoconductive layer 215. On the photoconductive layer 215 are formed the signal electrodes 214 made of aluminum, for example, by photolithography. Formation and rubbing of an alignment film may follow as required.

The resultant substrates 217 and 220 are bonded together. After spaces between the rib walls are decompressed, a mixed gas of helium and xenon is enclosed therein to form the plasma light-emitting channels 225a. In the case of fabricating a large-size panel, a plurality of such substrates 217 may be bonded to one substrate 220.

The resultant substrate 217 is then bonded with the substrate 211 so that the respective electrodes are located inside facing each other while controlling the gap therebetween using appropriate spacers. A desired liquid crystal material is then injected into the gap to form the liquid crystal layer 213. Thus, the fabrication of the LCD apparatus 200 is completed. The thus-fabricated LCD apparatus 200 of this embodiment which has transparent substrates and uses ultraviolet as addressing light realizes transmission mode display.

Figure 5:
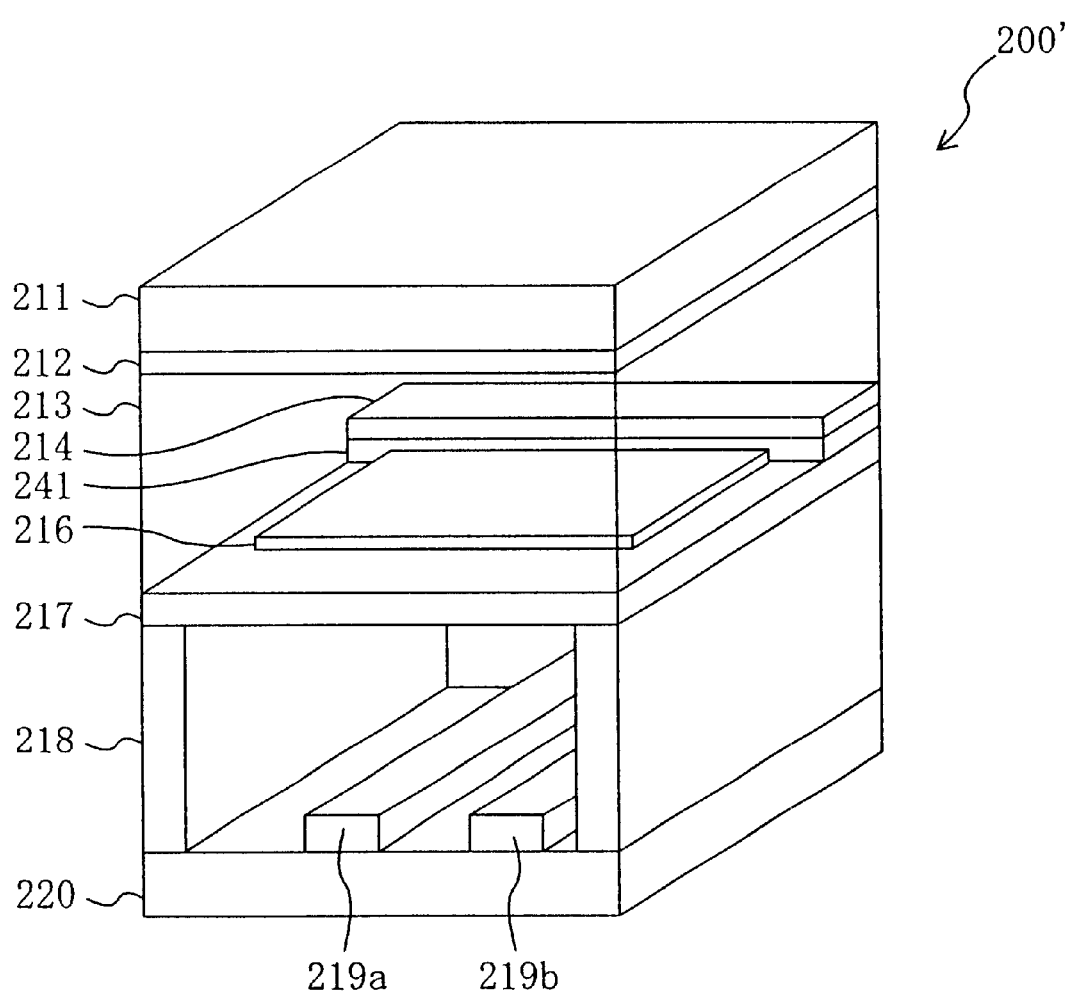
FIG. 5 is a view diagrammatically illustrating a modification of the liquid crystal display apparatus shown in FIG. 2 according to the present invention.

The photoconductive layer 215 is not necessarily formed over substantially the entire display region as in the above exemplified method. Since the purpose for providing the photoconductive layer 215 is to switch the electrical connection between the pixel electrodes 216 and the signal electrodes 214 using light, a construction such as an LCD apparatus 200' shown in FIG. 5 is also possible, where photoconductive layers 241 in a shape of stripes similar to that of the signal electrodes 214 are formed under the signal electrodes 214.

Since formation of active elements such as TFTs is not required, the LCD apparatus according to the present invention can be fabricated at a high yield and comparatively low cost. Moreover, since thin dielectric separators are not required unlike the conventional PALC display apparatus, fabrication of a large-size display is comparatively easy and the driving voltage can be reduced, realizing a display apparatus with low power consumption.

Embodiment 2

Figure 6A:
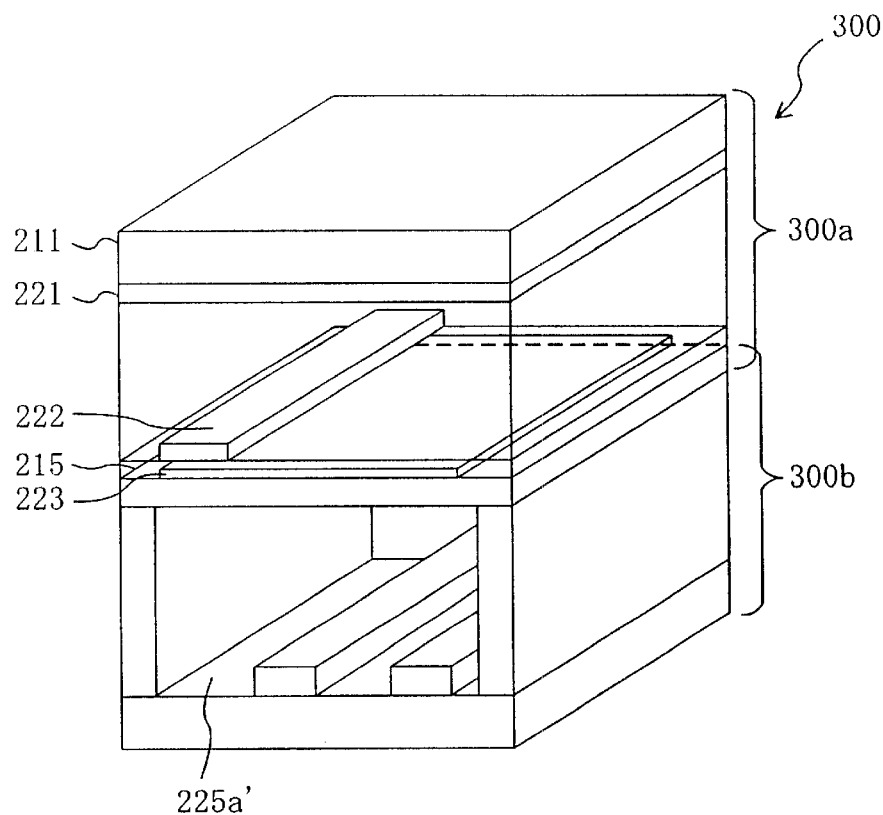
FIG. 6A is a view diagrammatically illustrating another liquid crystal display apparatus according to the present invention.

A liquid crystal display (LCD) apparatus 300 of this embodiment is diagrammatically shown in FIG. 6A. The LCD apparatus 300 includes a liquid crystal cell 300a and a plasma light-emitting cell 300b. The construction other than the liquid crystal cell 300a is substantially the same as that of the LCD apparatus 200 of EMBODIMENT 1, and thus components having substantially the same functions are denoted by the same reference numerals and the descriptions thereof are omitted here.

In the liquid crystal cell 300a, a plurality of stripe-shaped electrodes 221 are formed on the surface of the substrate 211 facing the liquid crystal layer. The stripe-shaped electrodes 221 extend in parallel with one another in the direction perpendicular to the length of signal electrodes 222. Plasma light-emitting channels 225a' extend in parallel with the signal electrodes 222 (Type II). In other words, the plurality of plasma light-emitting channels 225a' of the plasma light-emitting cell 300b and the stripe-shaped electrodes 221 are perpendicular to each other. Electrodes 223 of the LCD apparatus 300 of this embodiment may be formed in a matrix as the pixel electrodes 216 of the LCD apparatus 200 of EMBODIMENT 1, or may be formed into a plurality of stripe-shaped electrodes extending in the same direction as the signal electrodes 222.

The photoconductive layer 215 is not necessarily formed over substantially the entire display region as in the above exemplified construction. Since the purpose for providing the photoconductive layer 215 is to switch the electrical connection between the electrodes 223 and the signal electrodes 222 using light, a construction such as an LCD apparatus 300' shown in FIG. 6B is also possible, where photoconductive layers 215b in a shape of stripes similar to that of the signal electrodes 222 are formed under the signal electrodes 222.

Figure 6B:
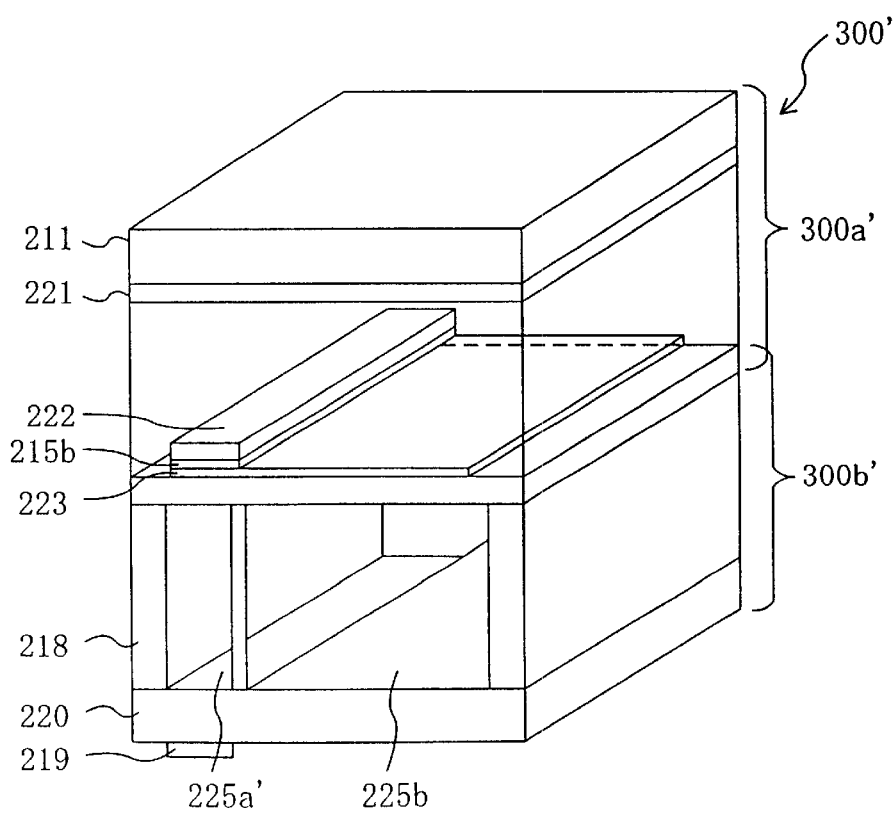
FIG. 6B is a view diagrammatically illustrating a modification of the liquid crystal display apparatus shown in FIG. 6A according to the present invention.

The modified LCD apparatus 300' shown in FIG. 6B is an example of a transmission type LCD apparatus using visible light for addressing.

A plasma light-emitting cell 300b' of the LCD apparatus 300' has narrow plasma light-emitting channels 225a' so that only the stripe-shaped photoconductive layers 215b underlying the signal electrodes 222 are irradiated with plasma-emitted light (electrodes for generating plasma are omitted in FIG. 6B). Spaces 225b are formed between the adjacent plasma light-emitting channels 225a' so that the transmission mode display is effected using light passing through these spaces 225b.

Shading layers 219 are formed on the bottom surface of the substrate 220 (the lower side as is viewed from the figure) in order to prevent light (typically, light from a backlight) from entering the plasma light-emitting channels 225a' from the bottom surface of the substrate 220. The rib walls 218 are preferably formed of shading glass frits (e.g., black glass frits) to shield the plasma light-emitting channels 225a' from light from the adjacent spaces 225b. Also, the signal electrodes 222 are preferably formed to completely cover the respective photoconductive layers 215b so that the photoconductive layers 215b are not exposed to ambient light incident from the side of the substrate 211.

The operational principle of the type of the LCD apparatus 300 of this embodiment (Type II) is basically the same as that of the LCD apparatus 200 of EMBODIMENT 1 (Type I) except for the following point. That is, in this embodiment where the plasma light-emitting channels 225a' are arranged in parallel with the signal electrodes 222, a voltage for driving the liquid crystal layer must be applied between the respective stripe-shaped electrodes 221 and the signal electrodes 222.

Embodiment 3

In an LCD apparatus of this embodiment, in order to improve the display characteristics of the LCD apparatus of EMBODIMENT 1, a storage capacitor electrically connected with each pixel electrode is additionally provided.

The LCD apparatus of EMBODIMENT 1 described above may occasionally have a trouble in adjusting the charge retaining time (especially, in securing a sufficient retaining time). The charge retaining time is determined depending on the resistance value of the liquid crystal material, the dielectric constants of insulating layers used in elements and alignment layers, the cell gap, the resistance value of the transparent electrodes, and the like. It is therefore very difficult to change the charge retaining time.

To overcome the above problem, in this embodiment, storage capacitors electrically connected with the pixel electrodes are additionally incorporated in the LCD apparatus of EMBODIMENT 1, to allow for setting of the charge retaining time.

Figure 7:
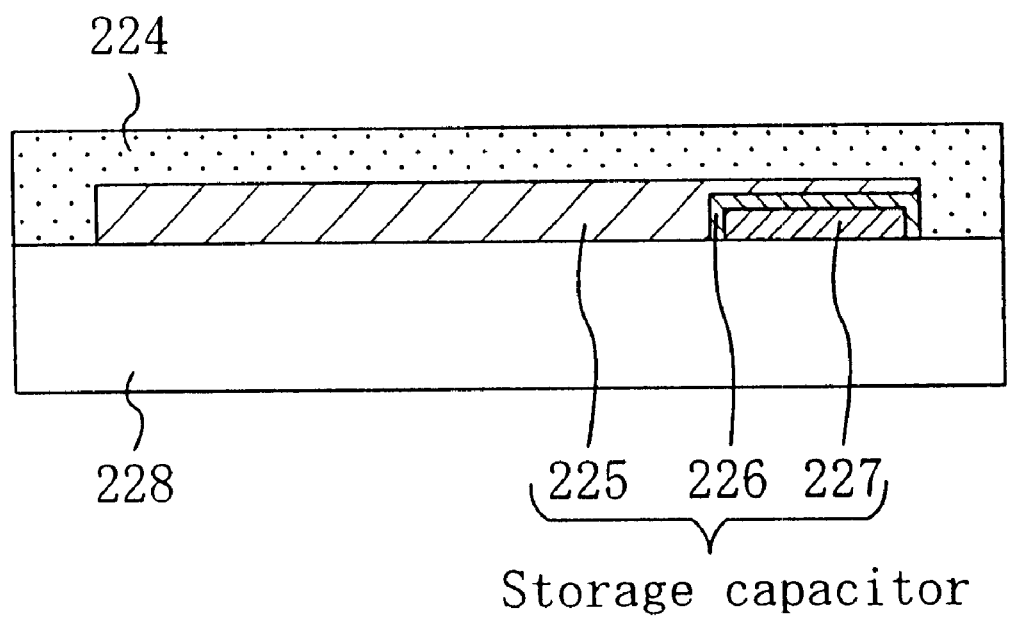
FIG. 7 is a view diagrammatically illustrating a storage capacitor in still another liquid crystal display apparatus according to the present invention.

FIG. 7 shows a diagrammatic construction of a storage capacitor. An electrode 227 made of a metal material is formed on a substrate 228 (corresponding to the substrate 217 of the LCD apparatus 200), which is then covered by an insulating layer 226. Thereafter, a pixel electrode 225 is formed so as to cover the metal electrode 227 and the insulating layer 226. The metal electrode 227/insulating layer 226/pixel electrode 225 constitute a storage capacitor.

Figure 8:
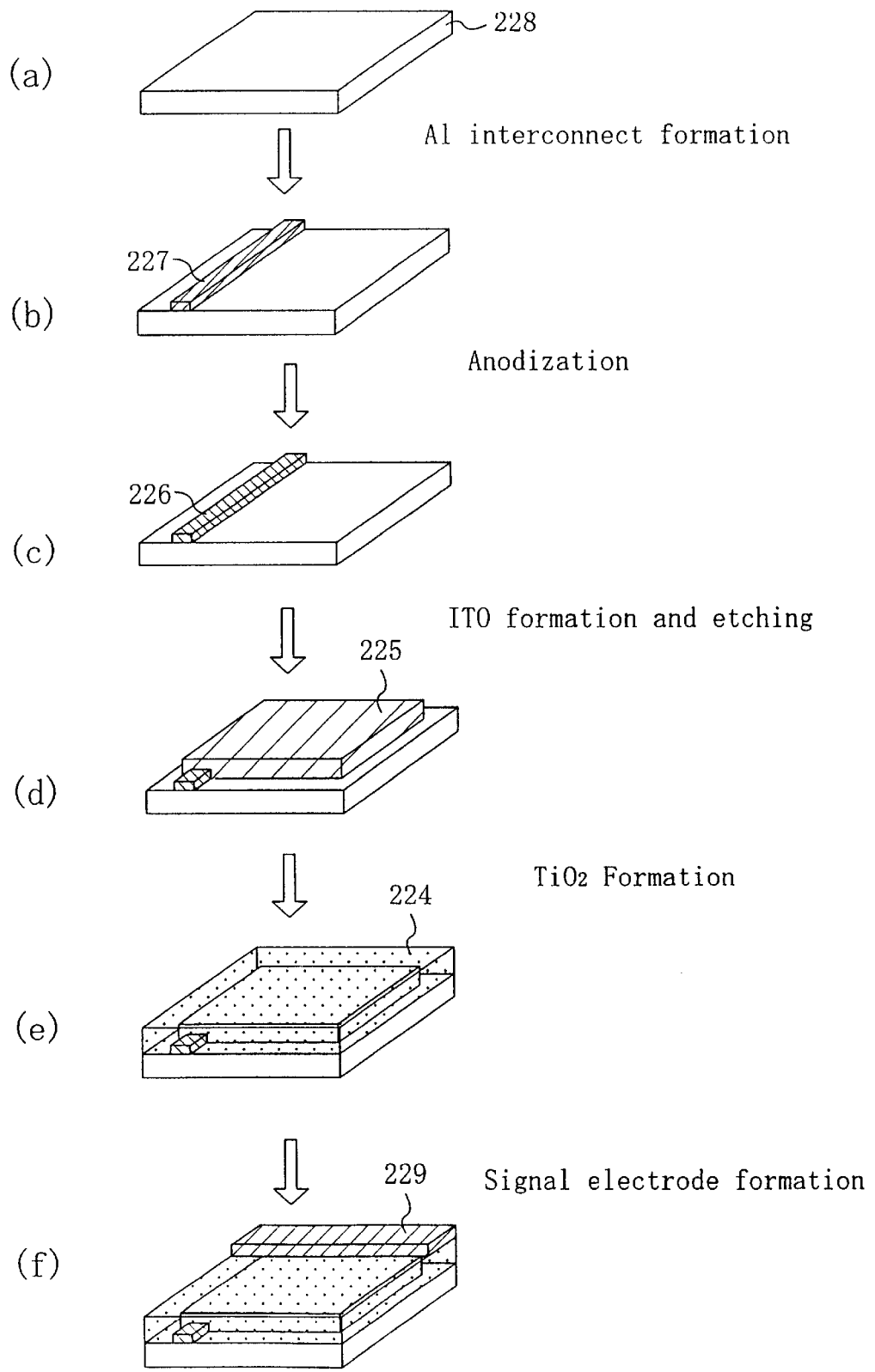
FIG. 8 is a view diagrammatically illustrating steps (a), (b), (c), (d), (e), and (f) of part of a fabrication method of the liquid crystal display apparatus shown in FIG. 7 according to the present invention.

A fabrication method of the LCD apparatus having storage capacitors will be described with reference to FIG. 8. In this embodiment, only the fabrication process of the portion corresponding to the substrate 217 of the LCD apparatus 200 of EMBODIMENT 1 will be described for simplification.

An aluminum layer having a thickness of about 0.1 $\mu$m is formed by evaporation on the substrate 228 having a thickness of about 0.7 mm and etched into a shape of about 30 $\mu$m wide stripes to form the aluminum interconnects 227 (steps (a) and (b)). The aluminum interconnects 227 are then anodized to form insulating films (anodic oxidation films) on the surfaces thereof (step (c)). Then, ITO is deposited to a thickness of about 50 nm by sputtering and then etched into a dot pattern to form the pixel electrodes 225 arranged in a matrix (step (d)). The resultant structures of aluminum/ aluminum oxide/ITO serves as storage capacitors.

Subsequently, as in EMBODIMENT 1, a photoconductive layer 224 made of titanium oxide, for example, is formed step (e)), and then signal electrodes 229 made of aluminum, for example, are formed (step (f)). The directions of the stripes of the signal electrodes 229 and the aluminum interconnects 227 are perpendicular to each other.

It is needless to mention that the retaining time can be changed by changing the width of the aluminum interconnects 227 and the thickness of the insulating layers 226 underlying the pixel electrodes 225 as well as the structure thereof (e.g., silicon nitride may further be deposited on the aluminum oxide layers 226 by sputtering)

The aperture ratio of the LCD apparatus of this embodiment will not be reduced by forming the aluminum interconnects 227 at positions hidden by a black matrix between color filters which are formed on the counter substrate. Even if the width of the aluminum interconnects 227 becomes larger than the line width of the black matrix due to a requirement in the setting of the charge retaining time, the reduction in the aperture ratio can be minimized.

Embodiment 4

Figure 9:
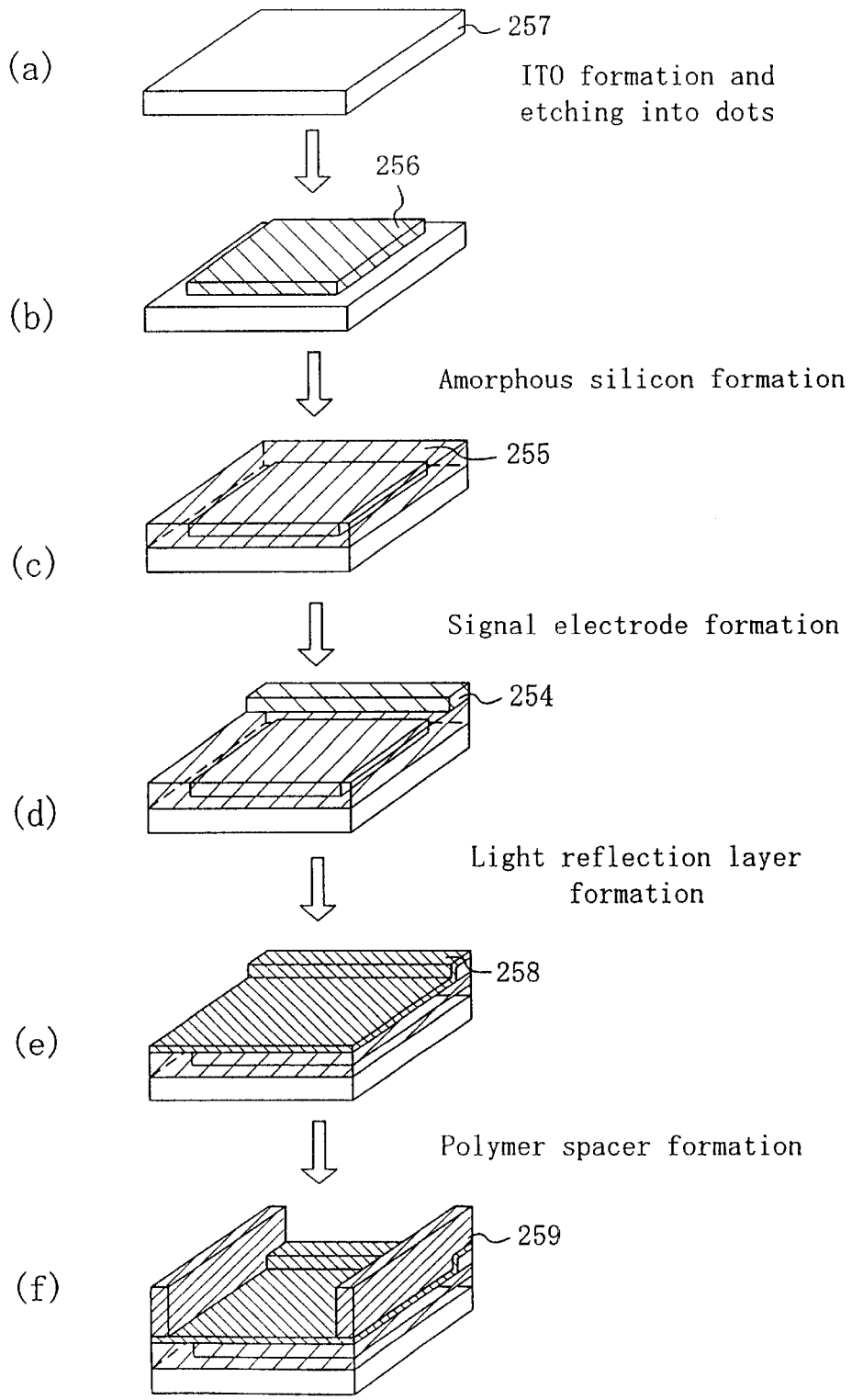
FIG. 9 is a view diagrammatically illustrating steps (a), (b), (c), (d), (e), and (f) of part of a fabrication method of yet another liquid crystal display apparatus according to the present invention.

In this embodiment, a reflection type LCD apparatus will be described. The LCD apparatus of this embodiment can be fabricated by basically the same method as that described in EMBODIMENT 1. In this embodiment, therefore, only the fabrication process of the portion corresponding to the substrate 217 of the LCD apparatus 200 will be described with reference to FIG. 9 for simplification.

In the reflection type LCD apparatus, visible light can be used as addressing light without the necessity of forming a special structure for shading the photoconductive layer from ambient light. The following fabrication method is described with respect to an LCD apparatus using visible light for addressing. It should be noted that an ultraviolet light addressing type LCD apparatus can also be fabricated by the following method by appropriately selecting the materials for the photoconductive layer and the substrate.

A glass substrate 257 is prepared as the substrate located between the plasma light-emitting cell and the photoconductive layer (corresponding to the substrate 217 of the LCD apparatus 200) (step (a)). Pixel electrodes 256 made of ITO are formed on the glass substrate 257 in substantially the same manner as that described in EMBODIMENT 1 (step (b)). Thereafter, an amorphous silicon layer 255 having a thickness of about 50 nm is formed by chemical vapor deposition (CVD), for example, as the photoconductive layer (step (c)). Signal electrodes 254 are then formed using Al, for example (step (d)). Covering the resultant entire surface, a light reflection layer 258 made of an about 0.1 µm thick dielectric multilayer film (e.g., a multilayer film of zinc sulfide and magnesium fluoride) is formed (step (e)). The light reflection layer 258 also serves as a shading layer for preventing visible light from entering the amorphous silicon layer 255 from the display surface of the display apparatus.

Thereafter, spacers 259 made of a polymer material having a shading function (e.g., a polymer material containing a black pigment) are formed to bury gaps between the adjacent pixel electrodes 256 (step (f)). The spacers 259 having a shading function serve to shield each pixel against unnecessary reflected light from adjacent pixels, thereby enhancing the contrast.

In the case of using a photoconductive layer of which electrical conductivity changes in response to visible light, the kind and pressure of a gas enclosed in the plasma light-emitting channels may be appropriately changed. For example, a mixed gas of neon and xenon having a comparatively high emission intensity can be used. Alternatively, an ultraviolet-emitting gas and a phosphor which emits visible light in response to ultraviolet may be combined. As such a combination, the combination conventionally used in the PDP can be used. Such a phosphor may be applied to inner walls of the plasma light-emitting channels, for example.

In the case of using visible light for addressing, the photoconductive layer may be formed of cadmium sulfide, for example, and EL elements and the like may be used as light sources for addressing. The combination of the material of the photoconductive layer and the light source for addressing can be selected from a variety of combinations of known materials and light sources.

Embodiment 5

In this embodiment, an improvement of the construction of the counter substrate of the LCD apparatus 200 of EMBODIMENT 1 will be described. When the electrode 212 is made of ITO in the case of a large-size display apparatus, since transparent conductive materials such as ITO have a comparatively low electrical conductivity, problems such as a delayed signal voltage, and distortion and reduced amplitude of the voltage waveform may occur in some cases. In this embodiment, in order to avoid the above problems, a metal electrode is formed so that it is electrically connected with the transparent electrode. Although a color filter layer for color display is formed together with the metal electrode in the following example, a construction without a color filter layer is also possible.

Figure 10:
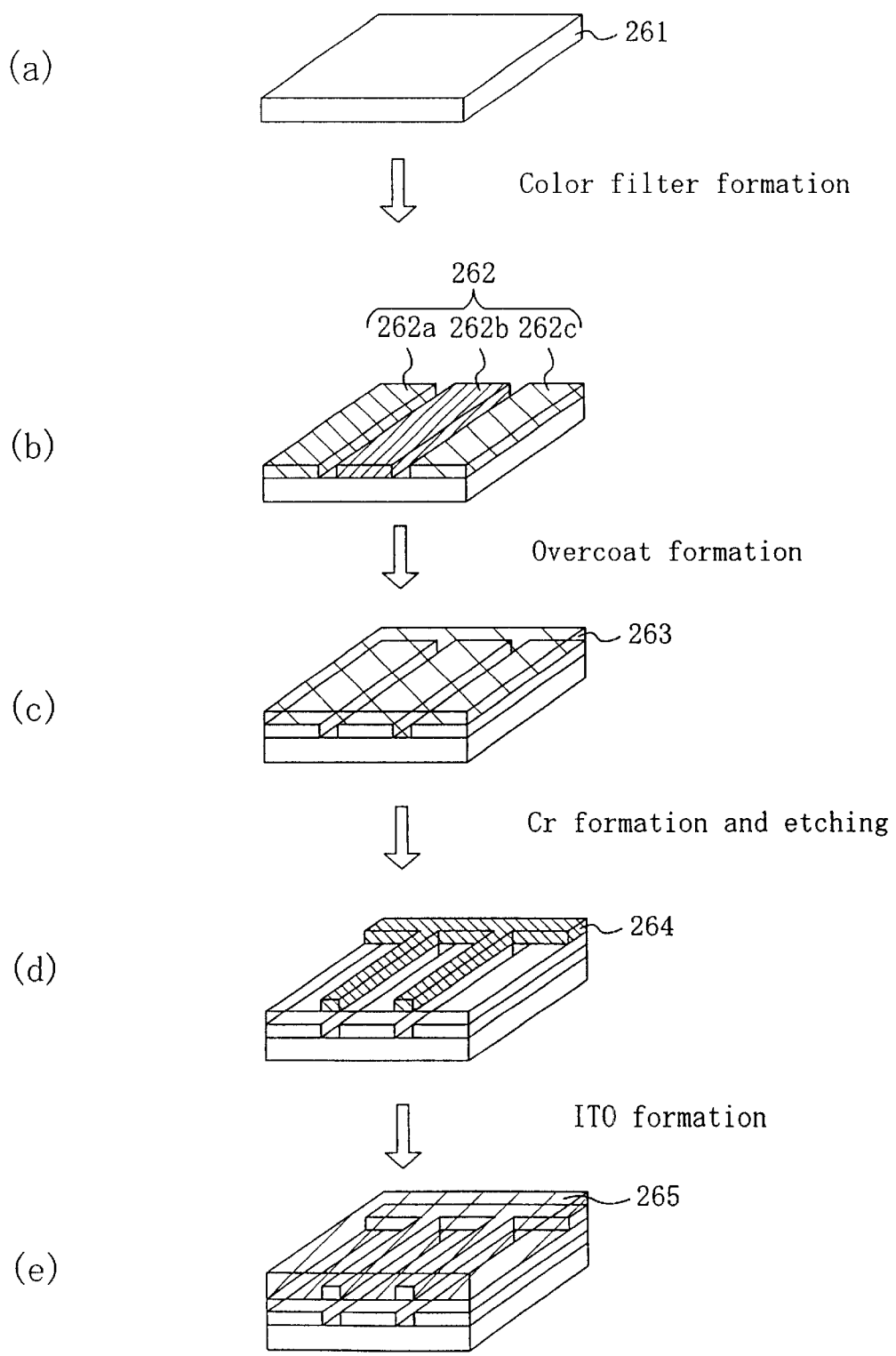
FIG. 10 is a view diagrammatically illustrating steps (a), (b), (c), (d), and (e) of part of a fabrication method of yet another liquid crystal display apparatus according to the present invention.

With reference to FIG. 10, the counter substrate of this embodiment as well as the fabrication method thereof will be described.

A stripe-shaped color filter layer 262 (composed of red, green, and blue color filters 262a, 262b, and 262c, for example) is formed on a glass substrate 261 having a thickness of about 1.1 mm using color resists (e.g., CR-2000 (red), CG-2000 (green), CB-2000 (blue) manufactured by Fuji Hunt Co., Ltd.) by repeating sequential steps of application of the color resists with a spinner, light exposure while masking, development, and baking (steps (a) and (b)).

An overcoat layer 263 is formed of a transparent polymer material (e.g., V259-PA manufactured by Nippon Steel Chemical Co., Ltd.) for flattening the substrate surface and protecting the color filter layer 262 (step (c)).

Further, metal electrodes 264 made of chromium, for example, having a thickness of about 0.2 µm are formed on the overcoat layer 263 at positions corresponding to the gaps between the adjacent pixel electrodes (see 216 in FIG. 2) (step (d)). The metal electrode 264 therefore serves also as a black matrix. Finally, an ITO film having a thickness of about 50 nm is formed over substantially the entire surface of the resultant substrate to obtain the counter electrode 265 (step (e)).

Embodiment 6

In the above embodiments, the pixel electrode and the signal electrode are coupled with each other via a capacitance formed between the pixel electrode and the signal electrode (pixel electrode/photoconductive layer/signal electrode). This may occasionally cause a problem that the potential at the pixel electrode varies due to an influence of the potential at the signal electrode, resulting in displacement of the voltage applied to the liquid crystal layer from a desired voltage value and thus lowering of display quality.

In this embodiment, a construction capable of reducing the capacitance formed between the pixel electrode and the signal electrode (capacitive coupling between the pixel electrode and the signal electrode) will be described. In this embodiment, only the construction of pixel electrode/photoconductive layer/signal electrode will be described. The construction of this embodiment can be applied to the LCD apparatuses of the above-described embodiments.

Figure 11A:
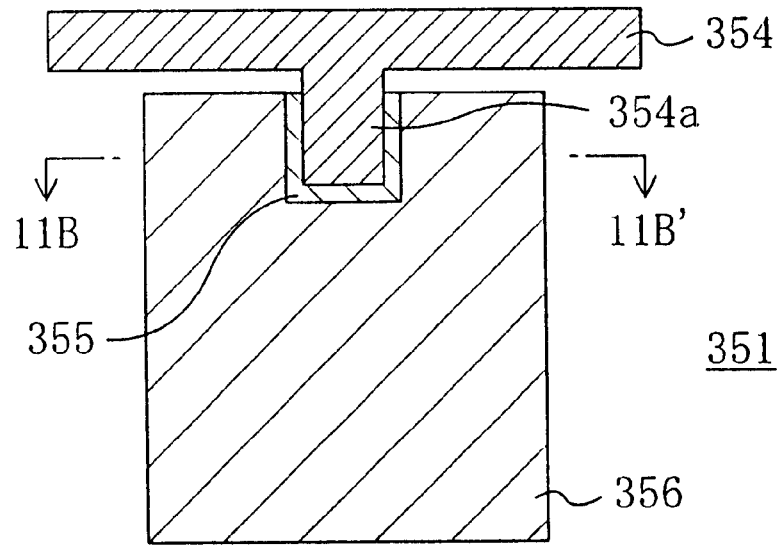
FIG. 11A is a plan view diagrammatically illustrating a construction of pixel electrode/photoconductive layer/signal electrode of yet another liquid crystal display apparatus according to the present invention.
Figure 11B:
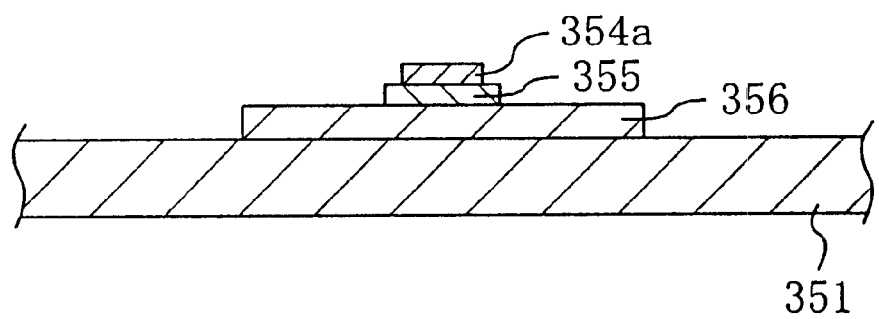
FIG. 11B is a cross-sectional view taken along line 11B–11B' of FIG. 11A.

FIGS. 11A and 11B are diagrammatic plan and cross-sectional views, respectively, of a construction of pixel electrode/photoconductive layer/signal electrode. For simplification, the following description is focused on a single pixel electrode among the plurality of pixel electrodes arranged in a matrix.

A dot-shaped pixel electrode 356 made of ITO, for example, is formed on a substrate 351. A dot-shaped photoconductive layer 355 is formed at a position corresponding to the center of a periphery of the pixel electrode 356. A signal electrode 354 formed in the gap between adjacent pixel electrodes 356 has a protrusion 354a branched therefrom to form a letter T so that the protrusion 354a is located on the photoconductive layer 355.

In the above construction, as is apparent from FIG. 11B, the region where the pixel electrode 356, the photoconductive layer 355, and the signal electrode 354 overlap one another to form a capacitance is limited to the area under the protrusion 354a of the signal electrode 354. The capacitance formed between the pixel electrode and the signal electrode is therefore smaller than that in the LCD apparatuses of the above embodiments shown in FIGS. 2 and 5. A plurality of dot-shaped photoconductive layers 355 may be formed for one pixel electrode. For example, two photoconductive layers 355 may be formed for connection of a protrusion of the signal electrode branched therefrom in the shape of an inverted U letter.

Figure 12A:
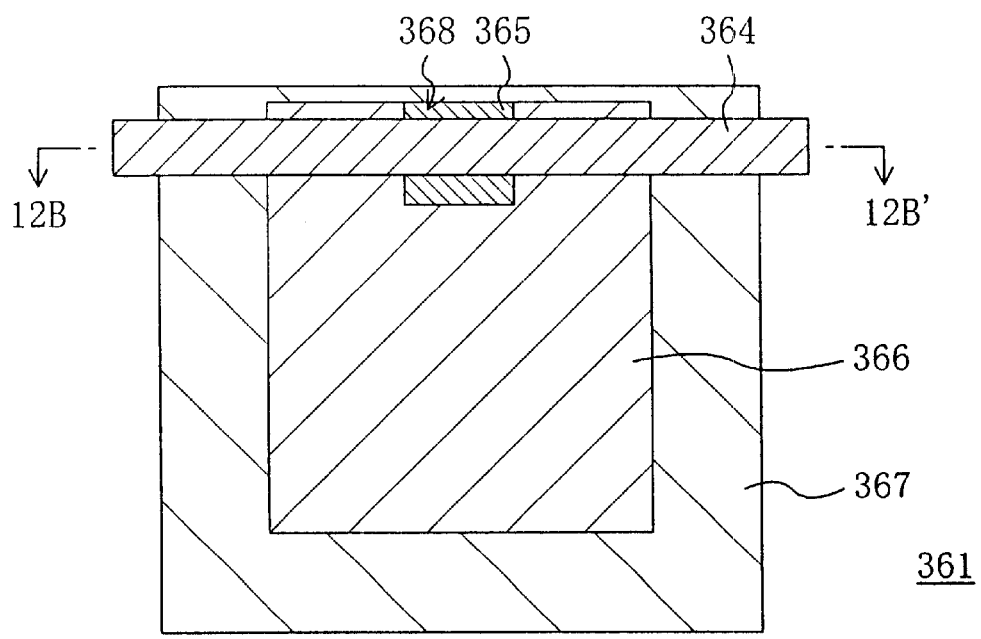
FIG. 12A is a plan view diagrammatically illustrating a construction of pixel electrode/photoconductive layer (and insulating layer)/signal electrode of a modification of the liquid crystal display apparatus shown in FIGS. 11A and 11B according to the present invention.
Figure 12B:
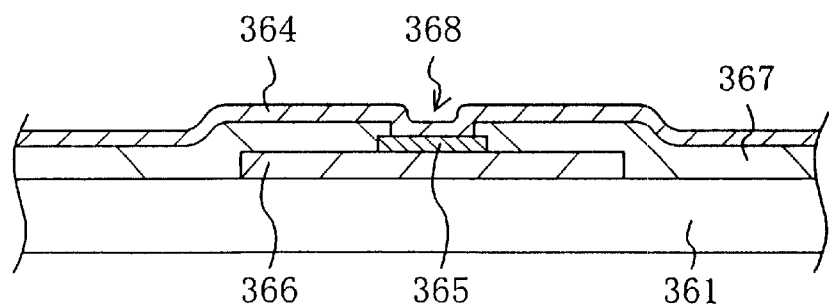
FIG. 12B is a cross-sectional view taken along line 12B–2B' of FIG. 12A.

Alternatively, a construction shown in FIGS. 12A and 12B can also reduce a capacitance formed between the pixel electrode and the signal electrode. A dot-shaped pixel electrode 366 made of ITO, for example, is formed on a substrate 361. A dot-shaped photoconductive layer 365 is formed at a position corresponding to the center of a periphery of the pixel electrode 366. An insulating film 367 is formed so as to cover substantially the entire surface of the resultant substrate 361, except for a through hole 368 formed on the photoconductive layer 365. A signal electrode 364 is formed to overlap the pixel electrode 366 and be in contact with the photoconductive layer 365 via the through hole 368. As is apparent from FIG. 12B, since the insulating film 367 is formed between the pixel electrode 366 and the signal electrode 364, the capacitance formed between the pixel electrode 366 and the signal electrode 364 can be reduced by adjusting the thickness and dielectric constant of the insulating film 367. The construction of this embodiment can be fabricated using known materials and fabrication method as in the above-described embodiments.

The reduction of the area of the photoconductive layer as described above also contributes to enhancing the efficiency of utilizing addressing light. Light emitted in the plasma light-emitting channel can be condensed to the photoconductive layer by forming a reflection layer on the inner wall of the plasma light-emitting channel and, as required, forming a member having a condensing function.

Embodiment 7

Figure 13:
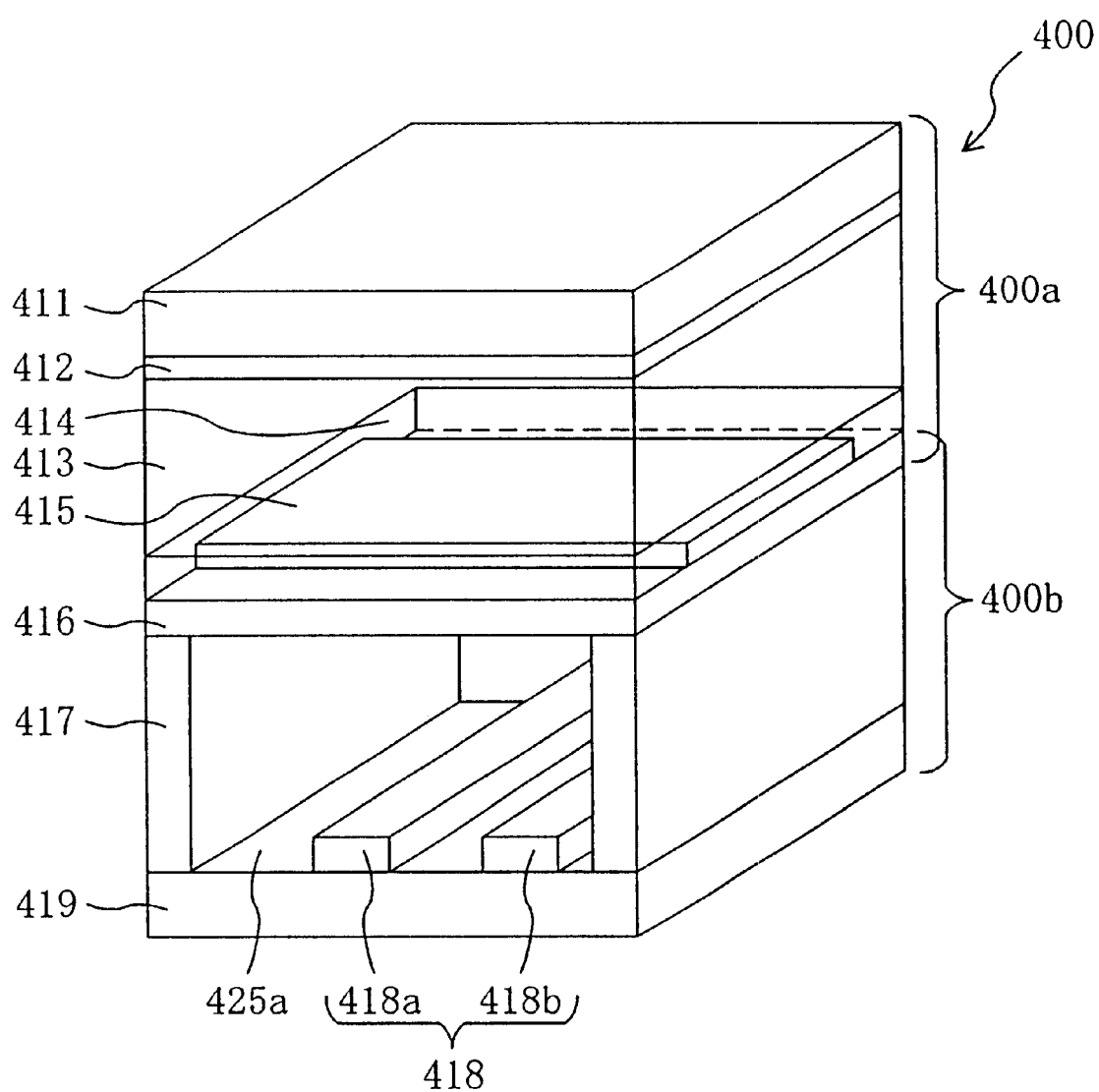
FIG. 13 is a view diagrammatically illustrating yet another liquid crystal display apparatus according to the present invention.

A liquid crystal display (LCD) apparatus 400 of this embodiment is diagrammatically shown in FIG. 13. The LCD apparatus 400 includes a liquid crystal cell 400a and a plasma light-emitting cell 400b, which share a substrate 416. The substrate 416 corresponds to the dielectric separator 104 of the conventional PALC display device shown in FIG. 1.

The liquid crystal cell 400a includes a liquid crystal layer 413 between a substrate 411 (first substrate) and the substrate 416 (second substrate). A counter electrode 412 made of a transparent conductive material such as ITO (indium tin oxide) is formed on the surface of the substrate 411 facing the liquid crystal layer 413 over substantially the entire display region. A color filter may also be formed as required.

A plurality of stripe-shaped signal electrodes 415 in parallel with one another and a photoconductive layer 415 covering the signal electrodes 415 are formed on the surface of the substrate 416 facing the liquid crystal layer 413. The photoconductive layer 414 is formed over substantially the entire display region.

The liquid crystal layer 413 can be formed of a liquid crystal material used for conventional active matrix LCD apparatuses, such as nematic liquid crystal and cholesteric liquid crystal. Alignment films may also be formed on the surfaces of the substrates 411 and 416 facing the liquid crystal layer 413 as required.

The plasma light-emitting cell 400b has a plurality of plasma light-emitting channels 425a formed by dividing a space between the substrate 416 and a substrate 419 with a plurality of rib walls 417. Each plasma light-emitting channel 425a encloses ionizable gas therein and generates plasma by application of a discharge pulse voltage between a cathode 418a and an anode 418b. The plasma light-emitting channels 425a extend in the direction perpendicular to the length of the signal electrodes 415 (Type I). By controlling ON/OFF of the plasma light-emitting channels 425a, therefore, the regions of the photoconductive layer 414 which are electrically connected with the signal electrodes 415 are selected (scanned) line-sequentially. In this construction where the regions of the photoconductive layer 414 located at the respective crossings of the signal electrodes 415 and the plasma light-emitting channels 425a are selected, the counter electrode 412 can be a single electrode.

The plasma light-emitting cell 400b may have substantially the same construction as the plasma cell of the PALC display device. The plasma light-emitting channels 425a may be formed by etching a thick substrate instead of providing the plurality of rib walls 417 on the substrate 419. The kind and pressure of the gas to be enclosed in the plasma light-emitting channels 425a may be optimized to enhance the luminous efficiency. For example, in the case of ultraviolet emission, helium, xenon, or a mixed gas thereof, for example, may be used. In the case of visible light emission, a mixed gas of neon and xenon may be used, or an appropriate phosphor may be applied to an inner wall of each plasma light-emitting channel 425a to change ultraviolet to visible light. Use of ultraviolet as addressing light is advantageous in that a transmission type LCD can be fabricated with a comparatively simple construction.

In the LCD apparatus according to the present invention, no limitation is imposed on the material and thickness of the substrate 416 disposed between the liquid crystal cell 400a and the plasma light-emitting cell 400b if the intensity of light from a light source for optical addressing and the sensitivity of the photoconductive layer are at adequate levels. They can be appropriately determined in consideration of the yield during the fabrication process. A quartz substrate and a fused silica substrate, for example, may be used when ultraviolet is used. In the case of a large-screen display apparatus, the substrate 416 may be constructed of a plurality of substrates.

The material of the photoconductive layer 414 may be selected from known materials which fully change the electrical conductivity thereof in response to addressing light, in consideration of the wavelength and intensity of addressing light and the construction of the apparatus. In the case of ultraviolet, titanium oxide ($TiO_2$), zinc oxide (ZnO), gallium nitride (GaN), and an organic photoconductor (OPC), for example, can be used. In the case of visible light, amorphous silicon, for example, can be used.

As a display apparatus utilizing plasma light emission, a so-called plasma display panel (PDP) is known. PDP is a self-emission type display apparatus where plasma-emitted ultraviolet is changed to visible light with a phosphor, to use the resultant visible light for display. On the contrary, the LCD apparatus according to the present invention utilizes light obtained by plasma light emission for addressing pixels. For display, light from a backlight is used in the case of a transmission type and ambient light is used in the case of a reflection type as in conventional LCD apparatuses. Therefore, the intensity of plasma light emission may only be in such a level that the electrical conductivity of the photoconductive layer can be fully changed. It is therefore possible to use comparatively weak light. For example, in the case of using plasma-emitted ultraviolet, since using emission lines is not required, the emission intensity can be optimized in consideration of the sensitivity of the photoconductive layer and the transmittance characteristics of the material of the substrate.

Figure 14A:
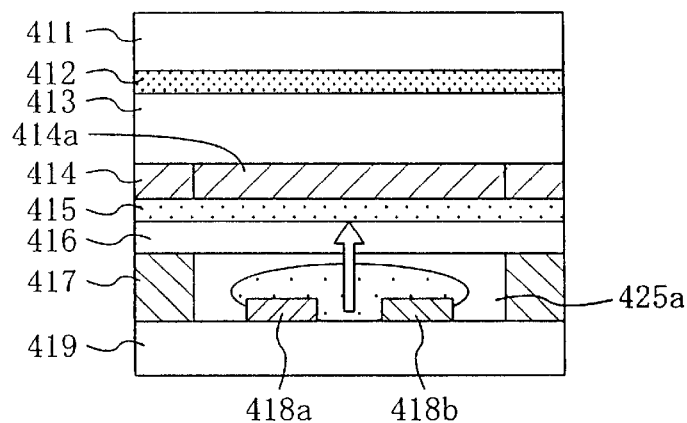
FIGS. 14A, 14B, and 14C are cross-sectional views for describing the operational principle of the liquid crystal display apparatus shown in FIG. 13 according to the present invention.
Figure 14B:
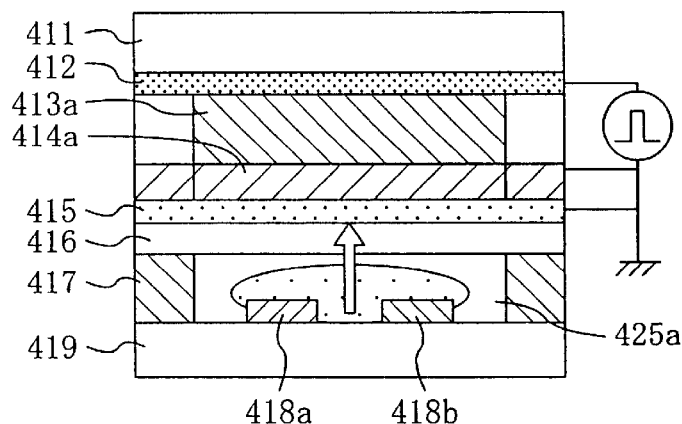
Figure 14C:
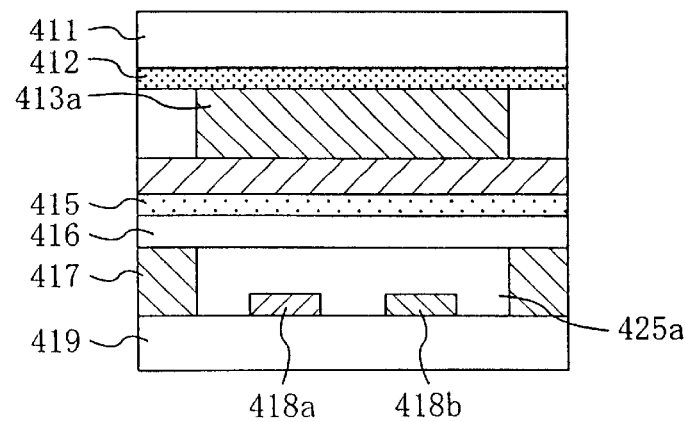

The operational principle of the LCD apparatus 400 of this embodiment will be described with reference to FIGS. 14A, 14B, and 14C. Gas enclosed in a selected plasma light-emitting channel 425a is ionized by applying a discharge pulse voltage between the cathode 418a and the anode 418b in the plasma light-emitting channel 425a, generating plasma. The generated plasma emits light of a wavelength which is different depending on the kind and pressure of the gas (FIG. 14A).

The emitted light passes through the substrate 416 (and the signal electrode 415) and irradiates a corresponding region 414a of the photoconductive layer 414. The electrical conductivity of the irradiated region 414a increases to allow the region 414a to serve as a conductor and thus be electrically connected with the signal electrode 415. As a result, the potential of the irradiated region 414a becomes the same as that of the signal electrode 415. When a driving voltage is applied between the counter electrode 412 and the signal electrode 415 in the above state, a voltage is applied to a domain 413a of the liquid crystal layer 413 located between the irradiated region 414a of the photoconductive layer 414 and the counter electrode 412 so as to drive the liquid crystal domain 413a which corresponds to one pixel (FIG. 14B).

When the application of a voltage between the cathode 418a and the anode 418b is terminated to stop plasma light emission, the electrical conductivity of the photoconductive layer 414 decreases to allow the photoconductive layer 414 to serve as an insulator and thus be electrically isolated from the signal electrode 415. Since the signal electrode 415/photoconductive layer 414/liquid crystal layer 413/counter electrode 412 serve as a capacitor, a charge corresponding to the driving voltage applied previously is retained on the pixel electrode 414, retaining the driving state of the domain 413a of the liquid crystal layer 413 (so-called sample hold state) (FIG. 14C). In the state where plasma light emission stops (quenching state), the domain 413a of the liquid crystal layer 413 is not applied with a sufficient voltage due to capacitance division even when a driving voltage is applied between the counter electrode 412 and the signal electrode 415 since the signal electrode 415 and the photoconductive layer 414 are electrically isolated from each other. The domain 413a of the liquid crystal layer 413 is to be applied with a new driving voltage when the plasma light-emitting channel 425a is selected (when plasma light emission occurs) in the next frame (or field).

The LCD apparatus 400 of this embodiment can be fabricated by a method similar to those for the conventional plasma addressed liquid crystal (PALC) display apparatus and plasma display panel (PDP). An exemplified method for fabricating the LCD apparatus 400 of EMBODIMENT 7 will be described with reference to FIGS. 15A, 15B, and 15C.

Figure 15A:
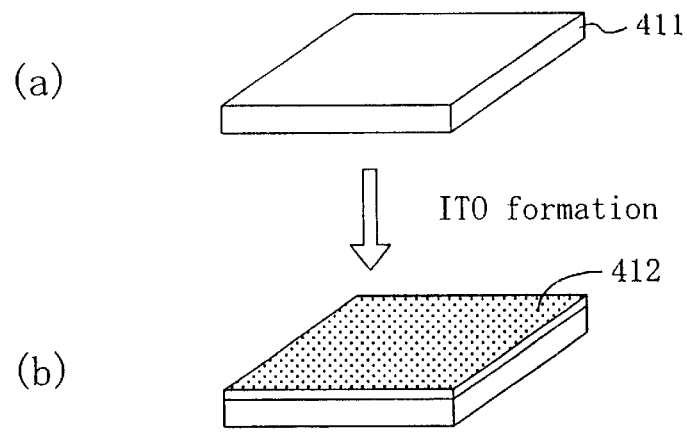
FIG. 15A is a schematic view illustrating steps (a) and (b) of a fabrication method of the liquid crystal display apparatus shown in FIG. 13 according to the present invention.

As shown by steps (a) and (b) of FIG. 15A, ITO is deposited to a thickness of about 50 nm on the glass substrate 411 having a thickness of about 1.1 mm by sputtering, for example, to form the counter electrode 412. An alignment film and a color filter may be formed as required.

Figure 15B:
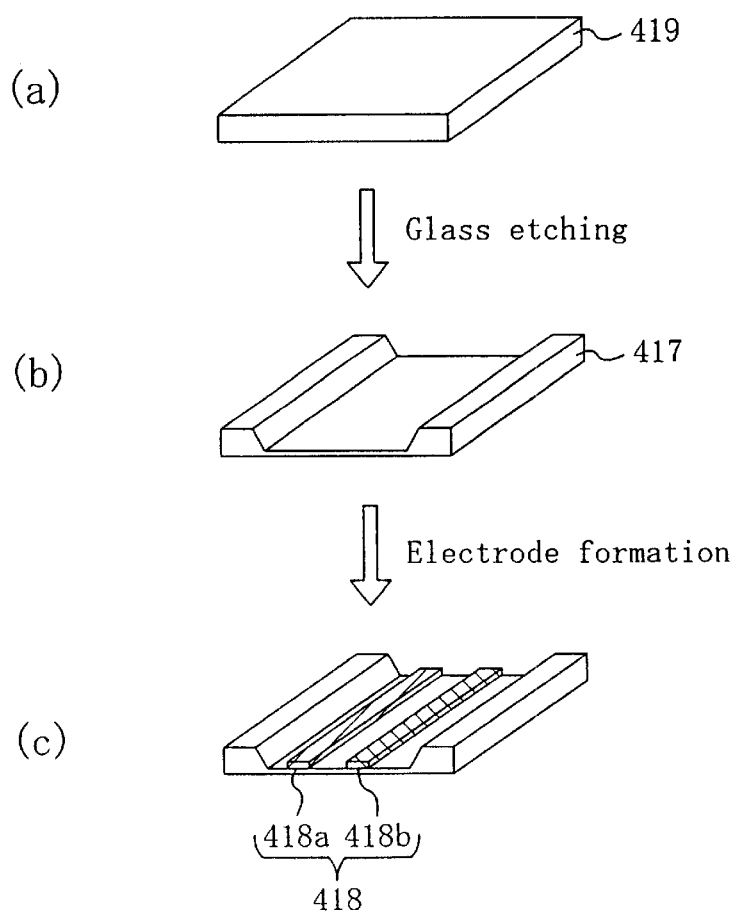
FIG. 15B is a schematic view illustrating steps (a), (b), and (c) of the fabrication method of the liquid crystal display apparatus shown in FIG. 13 according to the present invention.

As shown by steps (a), (b), and (c) of FIG. 15B, the glass substrate 419 having a thickness of about 1.1 mm is etched using hydrofluoric acid and the like, for example, to form the rib walls 417 having a height of about 200 $\mu$m. Alternatively, the rib walls 417 may be formed separately on the substrate 419 using glass frits, for example. The electrodes 418a and 418b for discharge can be formed by depositing a nickel film having a thickness of about 1 $\mu$m by sputtering and then etching the film.

Figure 15C:
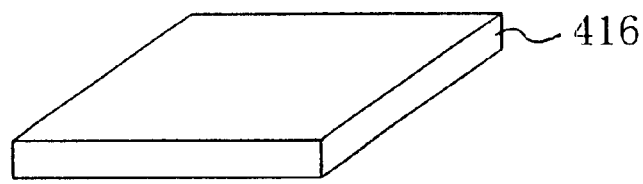
FIG. 15C is a schematic view illustrating steps (a), (b), and (c) of the fabrication method of the liquid crystal display apparatus shown in FIG. 13 according to the present invention.
Figure 15C:
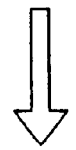
Figure 15C:
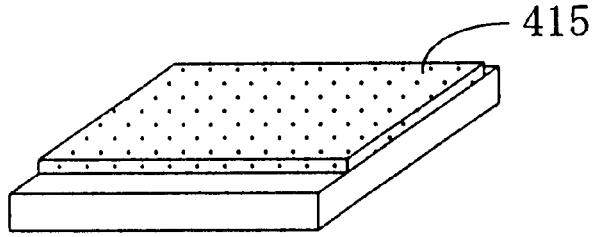
Figure 15C:
Figure 15C:
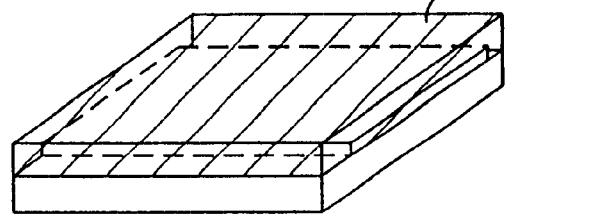

As shown by steps (a), (b), and (c) of FIG. 15C, a transparent conductive film having a thickness of about 15 nm is formed on the substrate 416 made of an ultraviolet transmissive material (e.g., a quartz substrate having a thickness of about 0.7 mm) by sputtering, for example (step (a)), and etched into a shape of stripes to form the signal electrodes 415 (step (b)). A titanium oxide film having a thickness of about 0.1 $\mu$m is then formed by sputtering covering substantially the entire surface of the substrate to form the photoconductive layer 414 (step (c)). Formation and rubbing of an alignment film may follow as required.

The resultant substrates 416 and 419 are bonded together. After spaces between the rib walls are decompressed, a mixed gas of helium and xenon, for example, is enclosed therein to form the plasma light-emitting channels 425a. In the case of fabricating a large-size panel, a plurality of such substrates 416 may be bonded to one substrate 419.

The resultant substrate 416 is then bonded with the substrate 411 so that the respective electrodes are located inside facing each other while controlling the gap therebetween using appropriate spacers. A desired liquid crystal material is then injected into the gap to form the liquid crystal layer 413. Thus, the fabrication of the LCD apparatus 400 is completed. The thus-fabricated LCD apparatus 400 of this embodiment which has transparent substrates and uses ultraviolet as addressing light realizes transmission mode display.

Figure 16A:
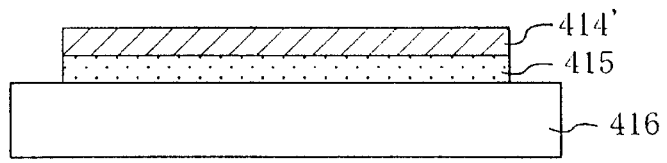
FIGS. 16A and 16B are views diagrammatically illustrating a modification of the liquid crystal display apparatus shown in FIG. 13 according to the present invention.
Figure 16B:
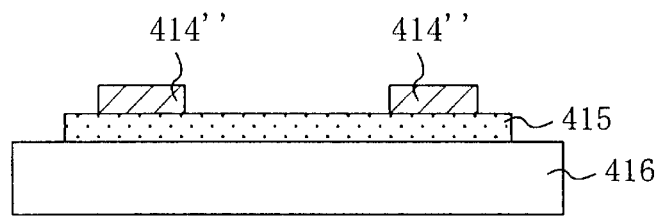

The photoconductive layer 414 is not necessarily formed over substantially the entire display region as in the above exemplified method. The purpose for providing the photoconductive layer 414 is to switch the electrical connection with the signal electrodes 415 using light. Therefore, as shown in FIG. 16A, photoconductive layers 414' in a shape of stripes similar to that of the signal electrodes 415 may be formed on the signal electrodes 415, or, as shown in FIG. 16B, photoconductive layers 414" in a shape of dots may be formed.

Since formation of active elements such as TFTs is not required, the LCD apparatus according to the present invention can be fabricated at a high yield and comparatively low cost. Moreover, since thin dielectric separators are not required unlike the conventional PALC display apparatus, fabrication of a large-size display is comparatively easy and the driving voltage can be reduced. Thus, a large-size display apparatus with low power consumption is realized.

Embodiment 8

Figure 17:
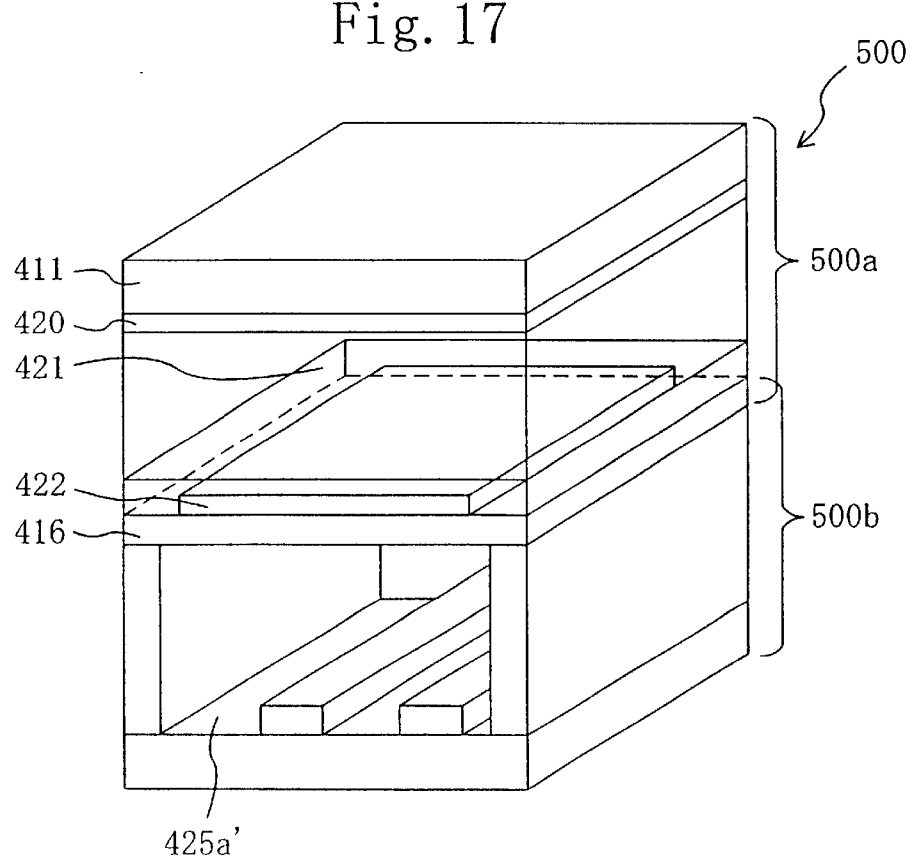
FIG. 17 is a view diagrammatically illustrating still another liquid crystal display apparatus according to the present invention.

A liquid crystal display (LCD) apparatus 500 of this embodiment is diagrammatically shown in FIG. 17. The LCD apparatus 500 includes a liquid crystal cell 500a and a plasma light-emitting cell 500b. The construction other than the liquid crystal cell 500a is substantially the same as that of the LCD apparatus 400 of EMBODIMENT 7, and thus components having substantially the same functions are denoted by the same reference numerals and the descriptions thereof are omitted here.

In the liquid crystal cell 500a, a plurality of stripe-shaped electrodes 420 are formed on the surface of the substrate 411 facing the liquid crystal layer. The stripe-shaped electrodes 420 extend in parallel with one another in the direction perpendicular to the length of signal electrodes 422. Plasma light-emitting channels 425a' extend in parallel with the signal electrodes 422 (Type II). In other words, the plasma light-emitting channels 425a' of the plasma light-emitting cell 500b and the stripe-shaped electrodes 420 are perpendicular to each other. A photoconductive layer 421 is formed over substantially the entire surface of the substrate covering the signal electrodes 422.

The operational principle of the LCD apparatus 500 of this embodiment (Type II) is basically the same as that of the LCD apparatus 400 of EMBODIMENT 7 (Type I) except for the following point. That is, in this embodiment where the plasma light-emitting channels 425a' are arranged in parallel with the signal electrodes 422, a voltage for driving the liquid crystal layer must be applied between the respective stripe-shaped electrodes 420 and the signal electrodes 422.

Embodiment 9

Figure 18:
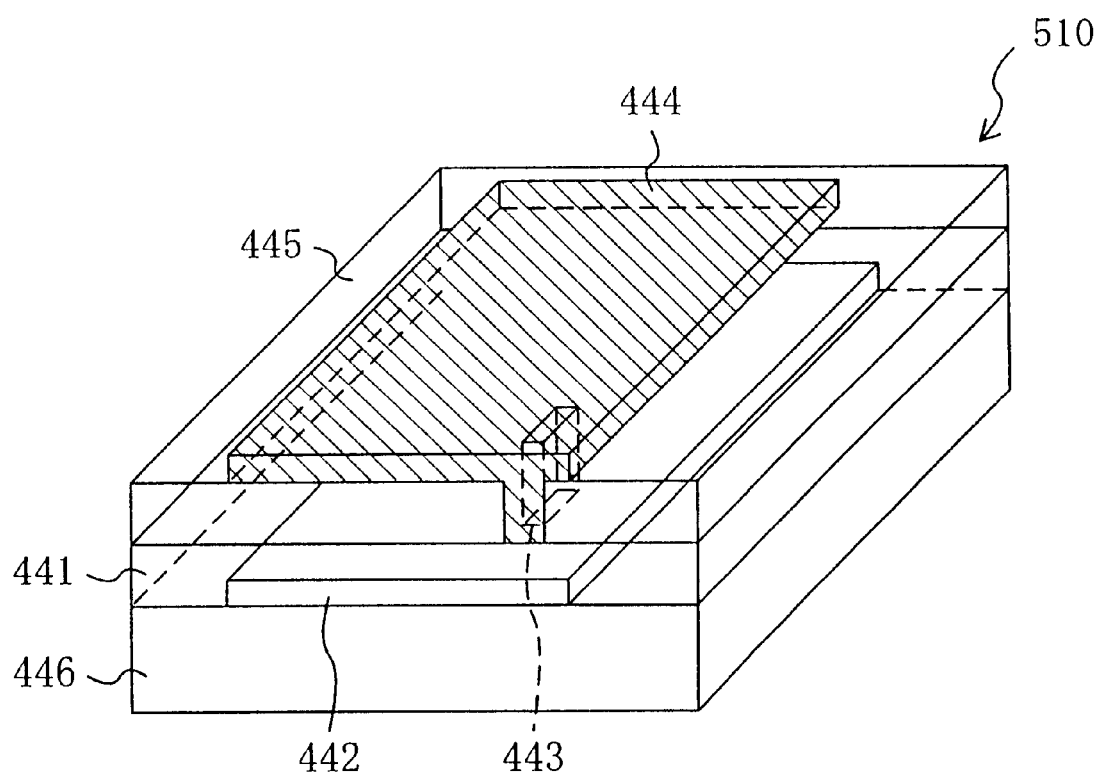
FIG. 18 is a view diagrammatically illustrating an addressing-side substrate of yet another liquid crystal display apparatus according to the present invention.

In this embodiment, the construction of the electrodes and the photoconductive layer formed on the side of the plasma light-emitting cell with respect to the liquid crystal layer is different from that in EMBODIMENTS 7 and 8 described above. FIG. 18 diagrammatically shows such a construction (which is hereinafter referred to as an addressing-side substrate 510) in this embodiment.

Referring to FIG. 18, a plurality of stripe-shaped signal electrodes 442 are formed on a substrate 446, and a photoconductive layer 441 is formed covering the plurality of signal electrodes 442. In this illustrated example, the single photoconductive layer 441 is formed over substantially the entire surface of the substrate so as to cover all the stripe-shaped signal electrodes 442. Alternatively, stripe-shaped photoconductive layers such as those shown in FIG. 16A or dot-shaped photoconductive layers such as those shown in FIG. 16B may be formed on the signal electrodes.

An insulating layer 445 is formed to cover the photoconductive layer 441, and dot-shaped pixel electrodes 444 are formed on the insulating layer 445. Contact holes 443 are formed through the insulating layer 445 and filled at least partly with the material constituting the pixel electrodes 444, for example, so that the pixel electrodes 444 and the photoconductive layer 441 are connected with each other via the respective contact holes 443.

The LCD apparatus of this embodiment can be fabricated using substantially the same materials and method as those used in EMBODIMENT 7. The material for the insulating layer is not specifically limited, but a wide variety of known organic and inorganic materials can be used. The formation of the insulating layer and contact holes can be done by known methods.

Figure 19A:
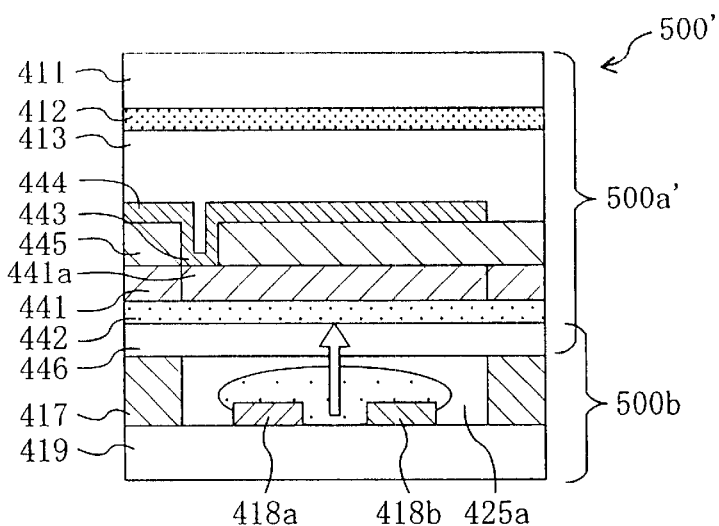
FIGS. 19A, 19B, and 19C are cross-sectional views for describing the operational principle of the liquid crystal display apparatus shown in FIG. 18 according to the present invention.
Figure 19B:
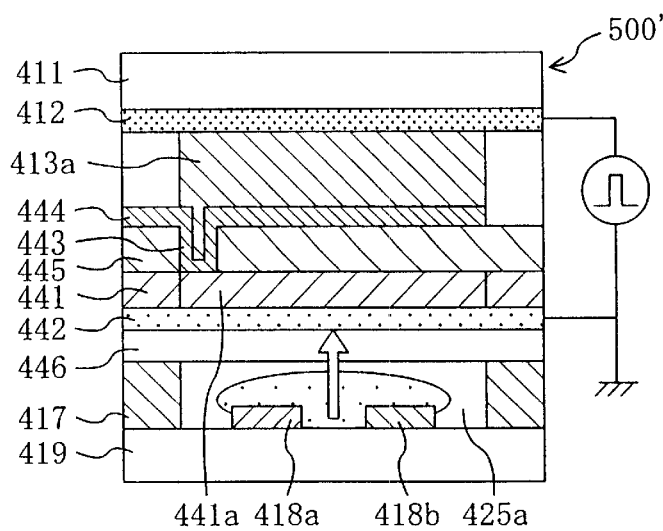
Figure 19C:
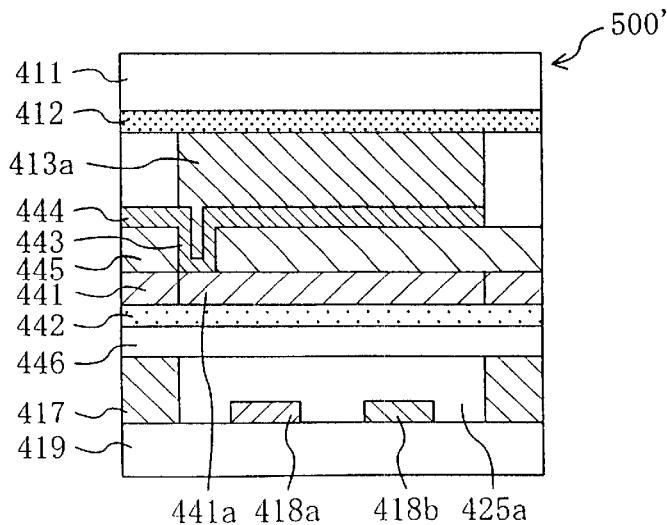

The operational principle of the LCD apparatus denoted by 500' of this embodiment having the addressing-side substrate 510 shown in FIG. 18 will be described with reference to FIGS. 19A, 19B, and 19C.

The LCD apparatus 500' includes a liquid crystal cell 500a' and a plasma light-emitting cell 500b'. The construction other than the liquid crystal cell 500a' is substantially the same as that of the LCD apparatus 400 of EMBODIMENT 7, and thus components having substantially the same functions are denoted by the same reference numerals and the descriptions thereof are omitted here.

The liquid crystal cell 500a' includes the addressing-side substrate 510 shown in FIG. 18. In this embodiment, the operation of the construction where the plasma light-emitting channels 425a extend in the direction perpendicular to the length of the signal electrodes 442 (Type I) will be described. Alternatively, the plasma light-emitting channels 425a may be arranged so as to extend in parallel with the signal electrodes 442 (Type II). In the latter case, however, the counter electrode 412 must be in the shape of a plurality of stripe-shaped electrodes extending in the direction perpendicular to the length of the signal electrodes 442 (see EMBODIMENT 8).

Gas enclosed in a selected plasma light-emitting channel 425a is ionized by applying a discharge pulse voltage between the cathode 418a and the anode 418b in the plasma light-emitting channel 425a, generating plasma. The generated plasma emits light of a wavelength which is different depending on the kind and pressure of the gas (FIG. 19A).

The emitted light passes through the substrate 446 (and the signal electrode 442) and irradiates a corresponding region 441a of the photoconductive layer 441. The electrical conductivity of the irradiated region 441a increases to allow the region 441a to serve as a conductor to electrically connect the signal electrode 442 and the pixel electrode 444 via the contact hole 443. When a driving voltage is applied between the counter electrode 412 and the signal electrode 442 in the state where the photoconductive layer 441 is in the conductive state, a voltage is applied to a liquid crystal domain 413a of the liquid crystal layer 413 located between the signal electrode 442 and the counter electrode 412, so as to drive the liquid crystal domain 413a corresponding to one pixel (FIG. 19B).

When the application of a voltage between the cathode 418a and the anode 418b is terminated to stop plasma light emission, the electrical conductivity of the photoconductive layer 441 decreases to allow the photoconductive layer 441 to serve as an insulator to electrically insulate the signal electrode 442 from the pixel electrode 444. Since the signal electrode 442/photoconductive layer 441/insulator 445/pixel electrode 444/liquid crystal layer 413/counter electrode 412 serve as a capacitor, a charge corresponding to the driving voltage applied previously is retained on the pixel electrode 444, retaining the driving state of the domain 413a of the liquid crystal layer 413 (so-called sample hold state) (FIG. 19C). In the state where plasma light emission stops (quenching state), the domain 413a of the liquid crystal layer 413 on the pixel electrode 444 is not applied with a sufficient voltage due to capacitance division even when a driving voltage is applied between the counter electrode 412 and the signal electrode 442 since the signal electrode 442 and the pixel electrode 444 are electrically isolated from each other. The domain 413a of the liquid crystal layer 413 is to be applied with a new driving voltage when the plasma light-emitting channel 425a is selected (when plasma light emission occurs) in the next frame (or field).

In the construction of this embodiment, the voltage applied to the liquid crystal layer 413 is divided according to the ratio of the capacitance formed by the signal electrode 442/photoconductive layer 441/insulating layer 445/pixel electrode 444 to the capacitance formed by the pixel electrode 444/liquid crystal layer 413/counter electrode 412. This construction is therefore advantageous in designing since large margins are allowable for the thickness and dielectric constant of the photoconductive layer 441 by adjusting the thickness and dielectric constant of the insulating layer 445.

Embodiment 10

In this embodiment, a reflection type LCD apparatus is fabricated. The basic construction of the LCD apparatus of this embodiment is the same as that of EMBODIMENT 9, and thus detailed description thereof is omitted here.

Figure 20:
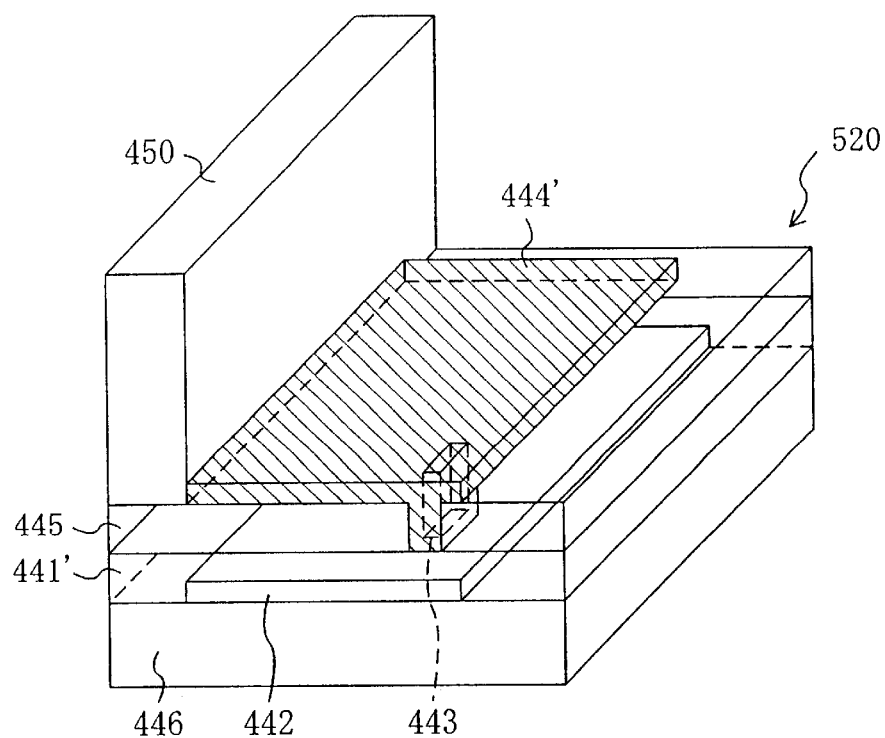
FIG. 20 is a view diagrammatically illustrating an addressing-side substrate of yet another liquid crystal display apparatus according to the present invention.

FIG. 20 shows an addressing-side substrate 520 of this embodiment, which is different from that in EMBODIMENT 9 in that a photoconductive layer 441' in this embodiment is formed using a material which changes its electrical conductivity in response to visible light (e.g., formed using amorphous silicon by CVD) and that pixel electrodes 444' are formed using a material which reflects visible light (e.g., formed using aluminum by sputtering). Further, spacers 450 made of a polymer material having a shading function (e.g., a polymer material containing a black pigment) may be formed burying gaps between the adjacent pixel electrodes 444' so as to serve to shield each pixel against unnecessary reflected light from adjacent pixels, thereby enhancing the contrast (in FIG. 20, a spacer on the right side of the pixel electrode 444' is omitted). Alternatively, a reflector film (e.g., a dielectric reflector film) may be formed on a transparent pixel electrode, in place of forming the pixel electrode made of a material which reflects visible light.

With the use of the photoconductive layer of which electrical conductivity changes in response to visible light, the kind and pressure of a gas enclosed in the plasma light-emitting channels are appropriately changed. For example, a mixed gas of neon and xenon having a comparatively high emission intensity of visible light can be used. Alternatively, an ultraviolet-emitting gas and a phosphor which emits visible light in response to ultraviolet may be combined. As such a combination, the combination conventionally used in the PDP can be used. Such a phosphor may be applied to inner walls of the plasma light-emitting channels, for example.

As the photoconductive layer in the case of using visible light for addressing, cadmium sulfide, for example, may be used. EL elements and the like may be used as light sources for addressing. The combination of the material of the photoconductive layer and the light source for addressing can be selected from a variety of combinations of known materials and light sources.

The reflection type LCD apparatus is advantageous in that a comparatively high contrast can be obtained by providing a single polarizing plate if an STN mode liquid crystal layer is used.

Embodiment 11

In an LCD apparatus of this embodiment, in order to improve the display characteristics of the LCD apparatuses of EMBODIMENTS 9 and 10, a storage capacitor electrically connected with a pixel electrode is additionally provided.

The LCD apparatuses of EMBODIMENTS 9 and 10 described above may occasionally have a problem in adjusting the charge retaining time (especially, in securing a sufficient retaining time). The charge retaining time is determined depending on the resistance value of the liquid crystal material, the dielectric constants of insulating layers used in elements and alignment layers, the cell gap, the resistance value of the transparent electrodes, and the like. It is therefore very difficult to change the charge retaining time.

To overcome the above problem, in this embodiment, storage capacitors electrically connected with the pixel electrodes are additionally incorporated in the LCD apparatus of EMBODIMENT 10, for example, to allow the charge retaining time to be set.

Figure 21:
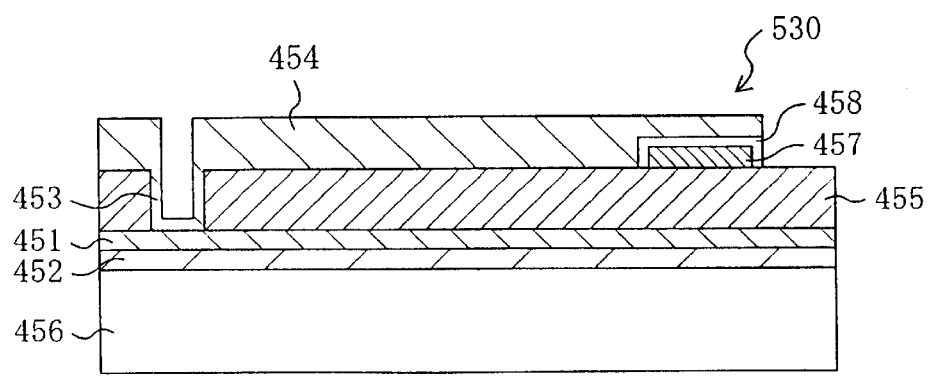
FIG. 21 is a view diagrammatically illustrating a storage capacitor of yet another liquid crystal display apparatus according to the present invention.

FIG. 21 shows a diagrammatic construction of an addressing-side substrate 530 including storage capacitors. A plurality of stripe-shaped signal electrodes 452 are formed on a substrate 456 (corresponding to the substrate 446 of the addressing-side substrate 510 of FIG. 18). A single photoconductive layer 451 (or a plurality of stripe-shaped photoconductive layers 451) is formed on the signal electrodes 452. An insulating layer 455 is formed covering the photoconductive layer 451 with contact holes 453 formed therethrough to connect pixel electrodes 454 formed on the insulating layer 455 with the photoconductive layer 451 via the contact holes 453.

Metal interconnects 457 and insulating layers 458 covering the metal interconnects 457 are formed between the pixel electrodes 454 and the insulating layer 455, so that the metal interconnect 457/insulating layer 458/pixel electrode 454 constitute a storage capacitor. In the illustrated example, each metal interconnect 457 is shown as a stripe-shaped electrode extending in the direction perpendicular to the length of the signal electrode 452. Other constructions of the metal interconnects are also applicable.

Such a storage capacitor is formed in the following manner, for example. An aluminum layer having a thickness of about 0.1 $\mu$m is formed by evaporation on the substrate 456 having a thickness of about 0.7 mm and etched into a shape of about 30 $\mu$m wide stripes to form the aluminum interconnects 457. The resultant aluminum interconnects 457 are anodized to form the insulating films 458 (anodic oxidation films) on the surfaces thereof. Then, ITO is formed to a thickness of about 50 nm by sputtering to cover the resultant substrate, and then etched into a dot pattern to form the pixel electrodes 454 arranged in a matrix. The resultant aluminum/aluminum oxide/ITO structure serves as storage capacitors.

It is needless to mention that the retaining time can be changed by changing the width of the aluminum interconnects 457 and the thickness of the insulating layers 458 underlying the pixel electrodes 454, as well as the structure thereof (e.g., silicon nitride may further be formed on the aluminum oxide interconnects 457 by sputtering)

The aperture ratio of the LCD apparatus of this embodiment will not be reduced by forming the aluminum interconnects 457 at positions hidden by a black matrix between color filters which are formed on the counter substrate. Even if the width of the aluminum interconnects 457 becomes larger than the line width of the black matrix due to a requirement in the setting of the charge retaining time, the reduction in the aperture ratio can be minimized.

Embodiment 12

In this embodiment, an improvement of the construction of the counter substrate of the LCD apparatus 500' of EMBODIMENT 9 (see FIG. 19A) will be described. When the electrode 412 is made of ITO in the case of a large-size display apparatus, since transparent conductive materials such as ITO have a comparatively low electrical conductivity, problems such as a delayed signal voltage and distortion and reduced amplitude of the voltage waveform may occur in some cases. In this embodiment, in order to avoid the above problems, a metal electrode is provided so that it is electrically connected with the transparent electrode. Although a color filter layer for color display is formed together with the metal electrode in the following example, a construction without a color filter layer is also possible.

Figure 22:
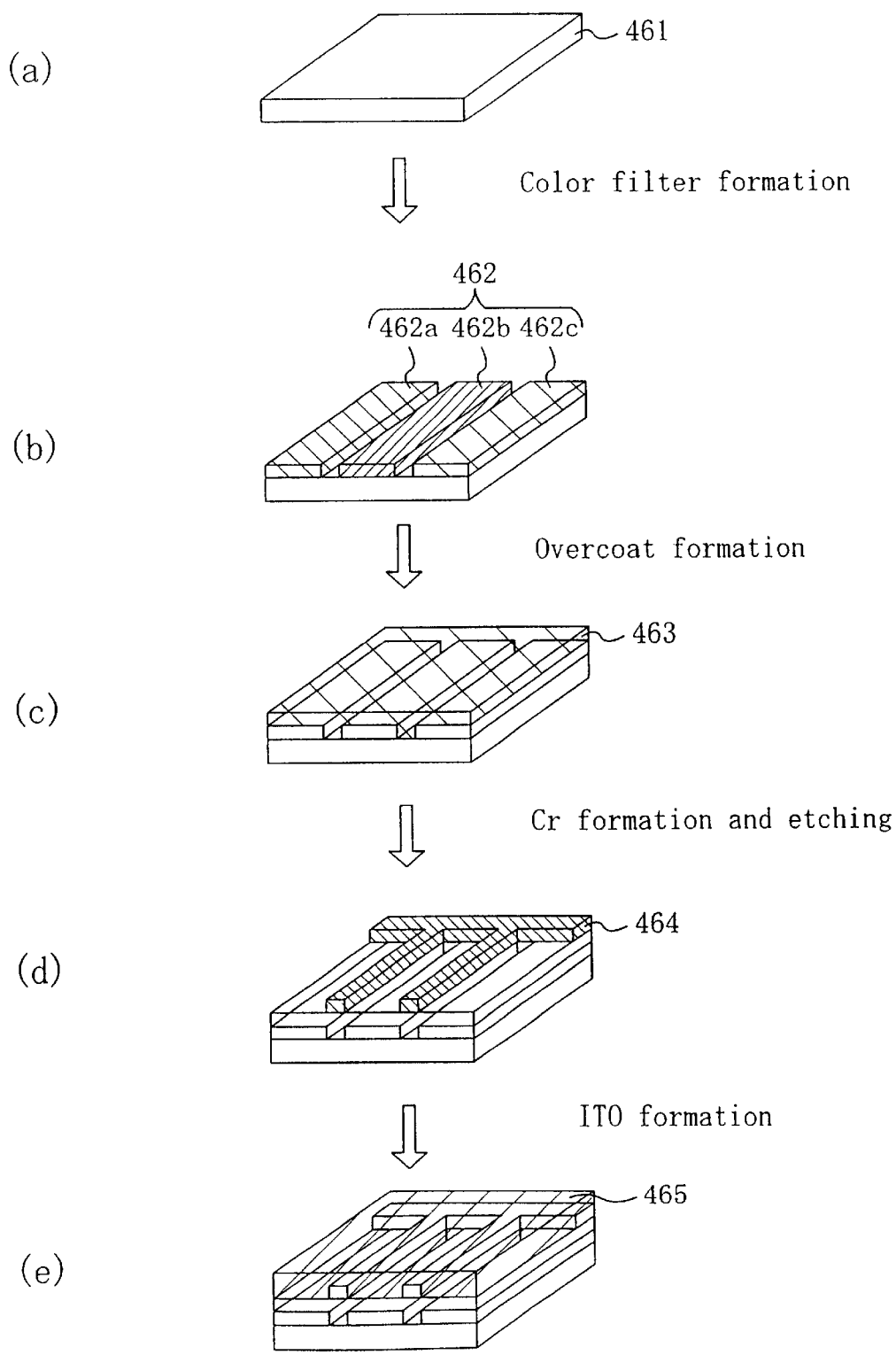
FIG. 22 is a view diagrammatically illustrating steps (a), (b), (c), (d), and (e) of part of a fabrication method of yet another liquid crystal display apparatus according to the present invention.

With reference to FIG. 22, the counter substrate of this embodiment as well as the fabrication method thereof will be described.

A stripe-shaped color filter layer 462 (composed of red, green, and blue color filters 462a, 462b, and 462c, for example) is formed on a glass substrate 461 having a thickness of about 1.1 mm using color resists (e.g., CR-2000 (red), CG-2000 (green), CB-2000 (blue) manufactured by Fuji Hunt Co., Ltd.) by repeating sequential steps of application of the color resists with a spinner, light exposure while masking, development, and baking (steps (a) and (b) of FIG. 22).

An overcoat layer 463 is formed of a transparent polymer material (e.g., V259-PA manufactured by Nippon Steel Chemical Co., Ltd.) for flattening the substrate surface and protecting the color filter layer 462 (step (c) of FIG. 22).

Further, metal electrodes 464 made of chromium, for example, having a thickness of about 0.2 μm are formed on the overcoat layer 463 at positions corresponding to the gaps between the adjacent pixel electrodes (see 444 in FIGS. 18 and 19A) (step (d) of FIG. 22). The metal electrode 464 therefore serves also as a black matrix. Finally, an ITO film having a thickness of about 50 nm is formed over substantially the entire surface of the resultant substrate to obtain the counter electrode 465 (step (e) of FIG. 22).

Embodiment 13

In EMBODIMENTS 9 and 10 above, the LCD apparatuses of Type I were described. It is needless to mention that LCD apparatuses of Type II having substantially the same construction as those in EMBODIMENTS 9 and 10 can also be fabricated.

The pixel electrode and the signal electrode are coupled with each other via a capacitance formed between the pixel electrode and the signal electrode (signal electrode/ insulating layer/photoconductive layer/pixel electrode). This may occasionally cause a problem that the potential at the pixel electrode varies due to an influence of the potential at the signal electrode, resulting in displacement of the voltage applied to the liquid crystal layer from a desired voltage value and thus lowering of display quality.

In this embodiment, a structure capable of reducing the capacitance formed between the signal electrode and the pixel electrode (capacitive coupling between the signal electrode and the pixel electrode) will be described. In this embodiment, only the construction of signal electrode/ photoconductive layer/insulating layer/pixel electrode will be described. The construction of this embodiment can be applied to the LCD apparatuses of the above-described embodiments.

Figure 23A:
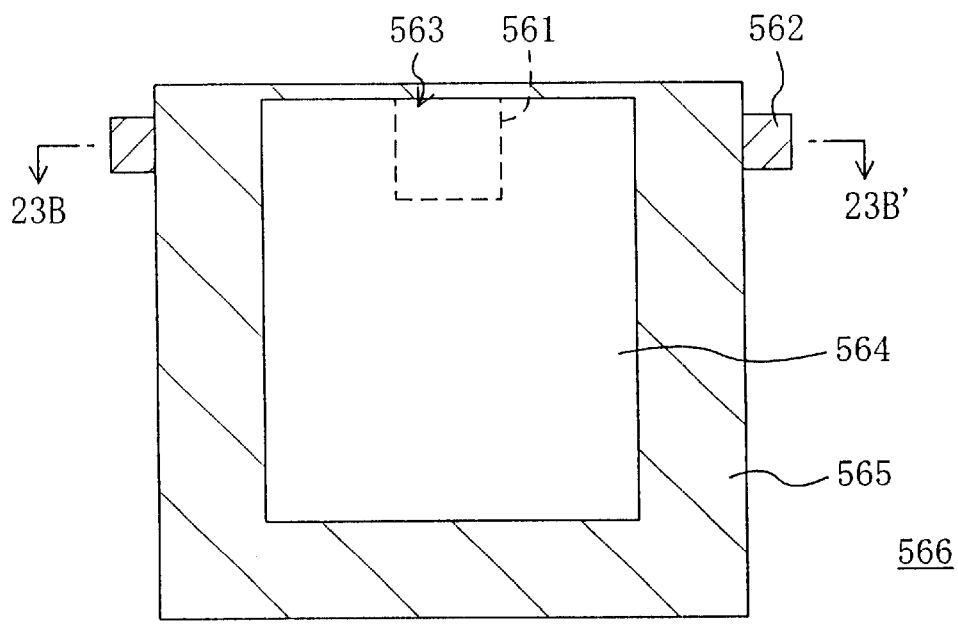
FIG. 23A is a diagrammatic plan view illustrating a construction of signal electrode/photoconductive layer/insulating layer/pixel electrode of yet another liquid crystal display apparatus according to the present invention.
Figure 23B:
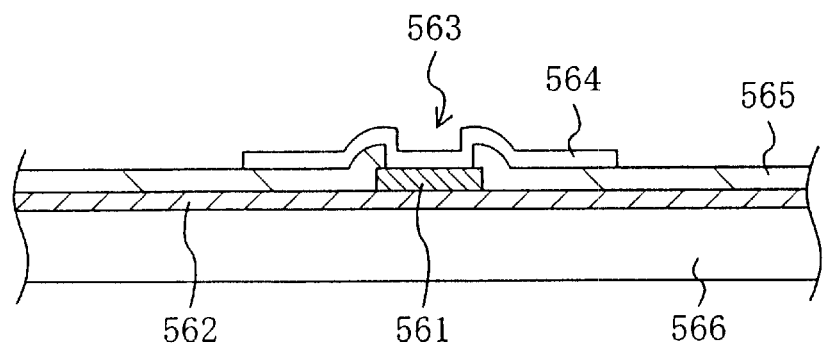
FIG. 23B is a cross-sectional view taken along line 23B–23B' of FIG. 23A.

FIGS. 23A and 23B are diagrammatic plan and cross-sectional views, respectively, of a construction of pixel electrode/photoconductive layer/signal electrode. For simplification, the following description is focused on a single pixel electrode among the plurality of pixel electrodes arranged in a matrix.

A signal electrode 562 is formed on a substrate 566. The width of the signal electrode 562 is made smaller than that of the signal electrodes in the previous embodiments so that the capacitance formed with a pixel electrode 564 is reduced. A dot-shaped photoconductive layer 561 is formed on the signal electrode 562, and an insulating layer 565 is formed over substantially the entire surface of the substrate 566 covering the signal electrode 562 and the photoconductive layer 561. A through hole 563 is formed through the insulating layer 565 on the photoconductive layer 561. The dot-shaped photoconductive layer 561 is formed so as to be located at a position corresponding to the center of a periphery of the pixel electrode 564, for example. The construction of this embodiment can be fabricated using known materials and fabrication method as in the above-described embodiments.

Figure 24A:
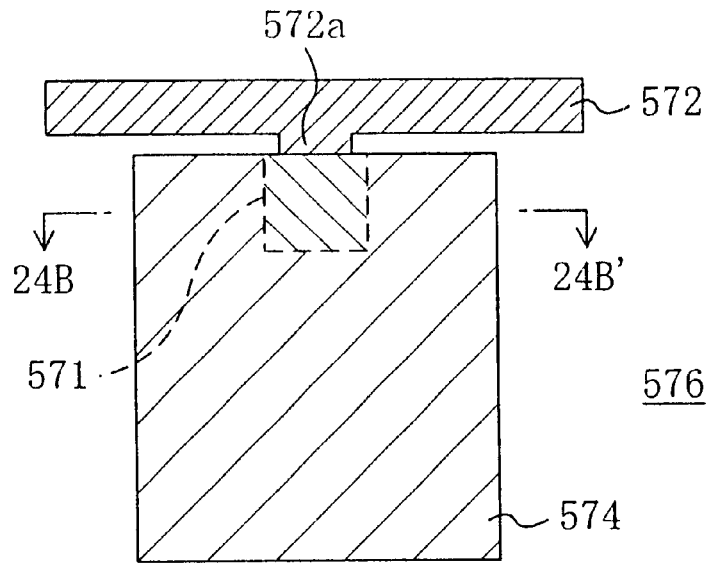
FIG. 24A is a diagrammatic plan view illustrating a construction of signal electrode/photoconductive layer/pixel electrode of a modification of the liquid crystal display apparatus shown in FIGS. 23A and 23B according to the present invention.
Figure 24B:
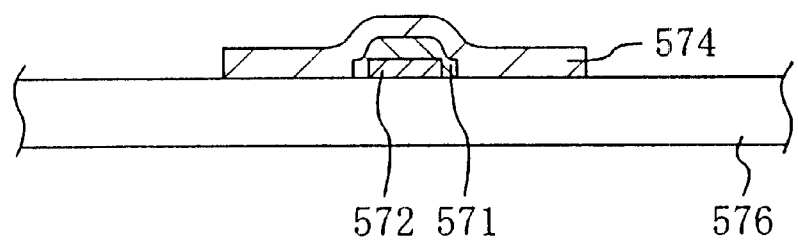
FIG. 24B is a cross-sectional view taken along line 24B–24B' of FIG. 24A.

A construction as shown in FIGS. 24A and 24B which omits an insulating film is also effective in reducing the capacitance formed between the signal electrode and the pixel electrode.

A signal electrode 572 formed on a substrate 576 in the gap between adjacent pixel electrodes 574 has a protrusion 572a branched therefrom to form a letter T. A dot-shaped photoconductive layer 571 is formed covering the protrusion 572a, and the pixel electrode 574 is formed covering the photoconductive layer 571.

As is apparent from FIGS. 24A and 24B, the region where the signal electrode 572 and the pixel electrode 574 overlap each other to form a capacitance is limited to the area of the protrusion 572a of the signal electrode 572. Therefore, the capacitance formed between the signal electrode and the pixel electrode is small. A plurality of dot-shaped photoconductive layers 571 may be formed for one pixel electrode. For example, two photoconductive layers 571 may be formed for connection with a protrusion of the signal electrode branched therefrom in the shape of an inverted U letter.

The reduction of the area of the photoconductive layer as described above also contributes to enhancing the efficiency of utilizing addressing light. Light emitted in the plasma light-emitting channel can be condensed to the photoconductive layer by forming a reflection layer on the inner wall of the plasma light-emitting channel and, as required, forming a member having a condensing function.

Embodiment 14

Figure 25:
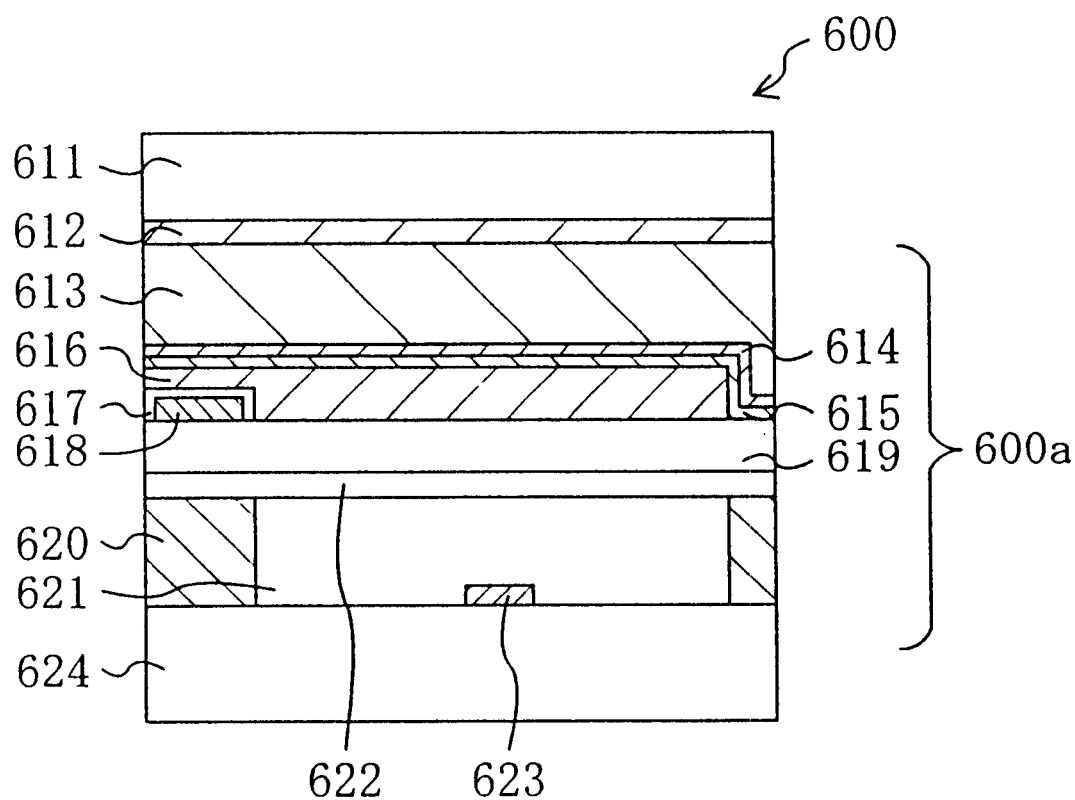
FIG. 25 is a diagrammatic cross-sectional view illustrating yet another liquid crystal display apparatus according to the present invention.

A liquid crystal display (LCD) apparatus 600 of this embodiment is diagrammatically shown in FIG. 25. The LCD apparatus 600 includes an optical addressing device 600a, a substrate 611 having a counter electrode 612, and a liquid crystal layer 613 sandwiched thereby. The counter electrode 612, which is made of a transparent conductive material such as ITO, is formed over substantially the entire display region. A color filter may also be formed as required.

The optical addressing device 600a includes a plurality of stripe-shaped plasma light-emitting channels 621 formed by dividing a space between a substrate 619 and a substrate 624 with a plurality of rib walls 620. Each plasma light-emitting channel 621 encloses ionizable gas therein and generates plasma by application of an AC voltage between a first electrode 622 and a second electrode 623. The first electrode 622 may be formed as a single common electrode for the plurality of plasma light-emitting channels 621, or may be formed as stripe-shaped electrodes for the respective plasma light-emitting channels 621. In any case, in order to enhance the aperture ratio, the first electrode 622 is preferably formed at least over the entire surfaces of the respective plasma light-emitting channels 621.

On the other surface of the substrate 619 facing the liquid crystal layer 613 (opposite to the surface on which the plasma light-emitting channels 621 are formed) are formed a plurality of signal electrodes 614, a photoconductive layer 615, and a plurality of pixel electrodes 616 in the order closer to the liquid crystal layer 613. The pixel electrodes 616 are in a shape of dots arranged in a matrix, while the signal electrodes 614 are in a shape of stripes extending in parallel with one another in the direction perpendicular to the length of the plasma light-emitting channels 621. The signal electrodes 614 and the pixel electrodes 616 are connected with each other via the photoconductive layer 615. The photoconductive layer 615 may be a single common photoconductive film for the plurality of signal electrodes 614 and the plurality of pixel electrodes 616, or may be in the form of stripe-shaped photoconductive films for the respective signal electrodes 614. It may also be in the form of dot-shaped photoconductive layers for the respective pixel electrodes 616.

A metal interconnect 618 covered with an insulating layer 617 is formed under an end portion of each pixel electrode 616 (the position corresponding to each rib wall 620). The metal interconnect 618/insulating layer 617/pixel electrode 616 serve as a storage capacitor. In this illustrated example, each metal interconnect 618 is shown as a stripe-shaped electrode extending in the direction perpendicular to the signal electrode 614 (parallel to the plasma light-emitting channel 621). Other constructions of metal interconnects are also applicable.

In order to enhance the luminous efficiency of the optical addressing device 600*a*, the kind and pressure of a gas enclosed in the plasma light-emitting channels 621, as well as the structure (size of the space, etc.) of the plasma light-emitting channels 621, may be optimized. For example, in the case of emitting ultraviolet, helium, xenon, or a mixed gas thereof, for example, may be used. It is also possible to emit near-ultraviolet light by mixing the above mixed gas with mercury. In the case of emitting visible light, a mixed gas of neon and xenon may be used, or an appropriate phosphor may be applied to an inner wall of each plasma light-emitting channel 621 to change ultraviolet to visible light. Use of ultraviolet as addressing light is advantageous in that a transmission type LCD apparatus can be fabricated with a comparatively simple construction.

In the LCD apparatus according to the present invention, no limitation is imposed on the material and thickness of the substrate 619 disposed between the liquid crystal cell and the optical addressing device 600*a* as long as the intensity of addressing light from a light source and the sensitivity of the photoconductive layer are at adequate levels. They can be appropriately determined in consideration of the yield in the fabrication process. A quartz substrate and a fused silica substrate, for example, may be used when ultraviolet is used. In the case of a large-screen display apparatus, the substrate 619 may be constructed of a plurality of substrates.

The material of the photoconductive layer 615 may be selected from known materials which fully change the electrical conductivity thereof in response to addressing light, in consideration of the wavelength and intensity of the addressing light and the construction of the apparatus. In the case of ultraviolet, titanium oxide ($TiO_2$), zinc oxide (ZnO), gallium nitride (GaN), and an organic photoconductor (OPC), for example, can be used. In the case of visible light, amorphous silicon can be used.

As a display apparatus using plasma light emission, a so-called plasma display panel (PDP) is known. PDP is a self-emission type display apparatus where plasma-emitted ultraviolet is changed to visible light with a phosphor, to use the resultant visible light for display. On the contrary, the LCD apparatus according to the present invention uses light obtained by plasma light emission for addressing pixels. For display, light from a backlight is used in the case of a transmission type and ambient light is used in the case of a reflection type as in the conventional LCD apparatus. Therefore, the intensity of plasma light emission may only be in such a level that the electrical conductivity of the photoconductive layer can be fully changed. It is therefore possible to use comparatively weak light. For example, in the case of using plasma-emitted ultraviolet, since using emission lines is not required, the emission intensity can be optimized in consideration of the sensitivity of the photoconductive layer and the transmittance characteristics of the substrate.

Figure 26A:
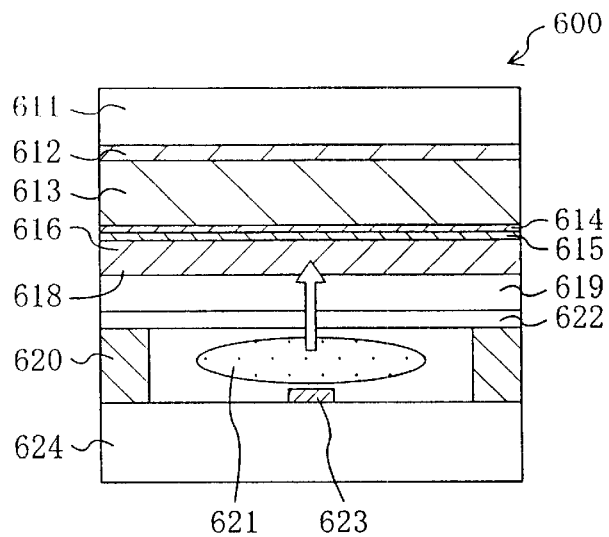
FIGS. 26A, 26B, and 26C are cross-sectional views for describing the operational principle of the liquid crystal display apparatus shown in FIG. 25 according to the present invention.
Figure 26B:
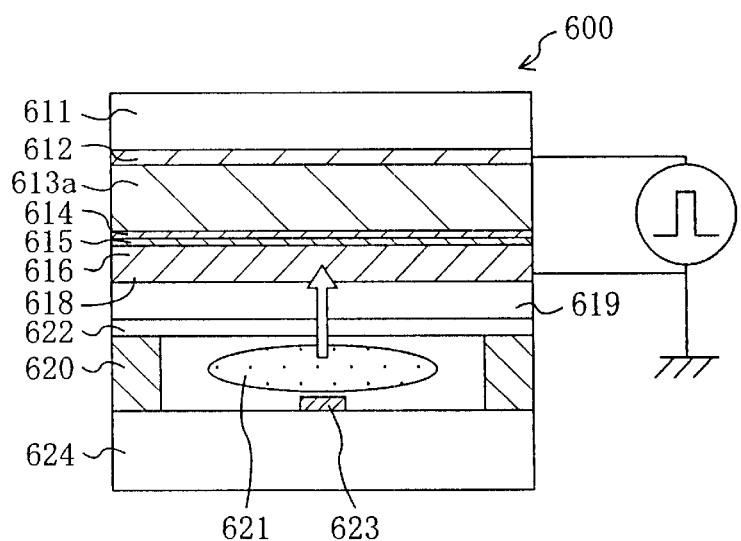
Figure 26C:
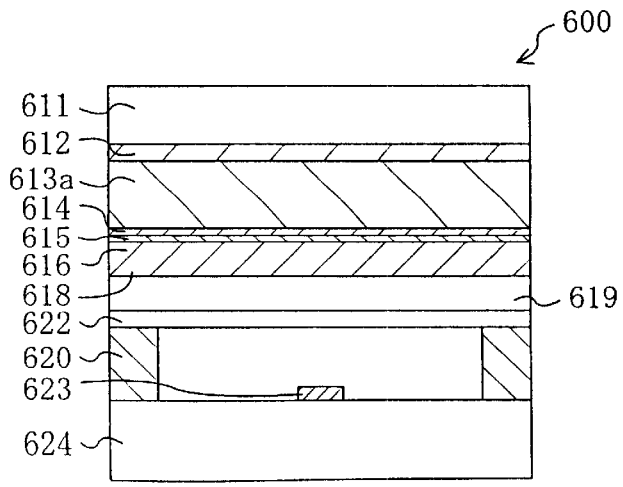

The operational principle of the LCD apparatus 600 of this embodiment will be described with reference to FIGS. 26A, 26B, and 26C. In the following description, the storage capacitor is omitted for simplification.

Gas enclosed in a selected plasma light-emitting channel 621 is ionized by applying an AC voltage between the first electrode 622 and the second electrode 623 in the plasma light-emitting channel 621, generating plasma. The generated plasma emits light of a wavelength which is different depending on the kind and pressure of the gas (FIG. 26A).

The emitted light passes through the substrate 619 and the pixel electrode 616, and irradiates the photoconductive layer 615. The electrical conductivity of the irradiated photoconductive layer 615 increases to allow the irradiated region of the photoconductive layer 615 to serve as a conductor to connect the pixel electrode 616 and the signal electrode 614. When a driving voltage is applied between the counter electrode 612 and the signal electrode 614 while the photoconductive layer 615 is in the conductive state, a voltage is applied to a domain 613*a* of the liquid crystal layer 613 located between the pixel electrode 616 and the counter electrode 612 so as to drive the liquid crystal domain 613*a* which corresponds to one pixel (FIG. 26B).

When the application of a voltage between the electrodes 622 and 623 is terminated to stop plasma light emission, the electrical conductivity of the photoconductive layer 615 reduces to allow the photoconductive layer 615 to serve as an insulator to electrically isolate the pixel electrode 616 from the signal electrode 614. Since the pixel electrode 616, the photoconductive layer 615, the liquid crystal layer 613, and the counter electrode 612 serve as a capacitor, a charge corresponding to the driving voltage applied previously is retained on the pixel electrode 616, retaining the driving state of the liquid crystal domain 613*a* (so-called sample hold state) (FIG. 26C). The charge retaining characteristics can be further improved by forming a storage capacitor.

In the state where plasma light emission stops (quenching state), the liquid crystal domain 613*a* is not applied with a sufficient voltage even when a driving voltage is applied between the counter electrode 612 and the signal electrode 614 since the pixel electrode 616 and the signal electrode 614 are electrically isolated from each other. A new driving voltage is applied to the pixel electrode 616 when the plasma light-emitting channel 621 is selected (when plasma light emission occurs) in the next frame (or field). In the quenching state, only the region of the liquid crystal layer 613 located above the signal electrode 614 is driven when a voltage is applied between the counter electrode 612 and the signal electrode 614. Therefore, by covering such a region with a black matrix or the like, lowering of display quality is prevented.

The optical addressing device 600*a* and the LCD apparatus 600 of this embodiment can be fabricated by the following method, for example, which will be described with reference to FIGS. 27A through 27C.

Figure 27A:
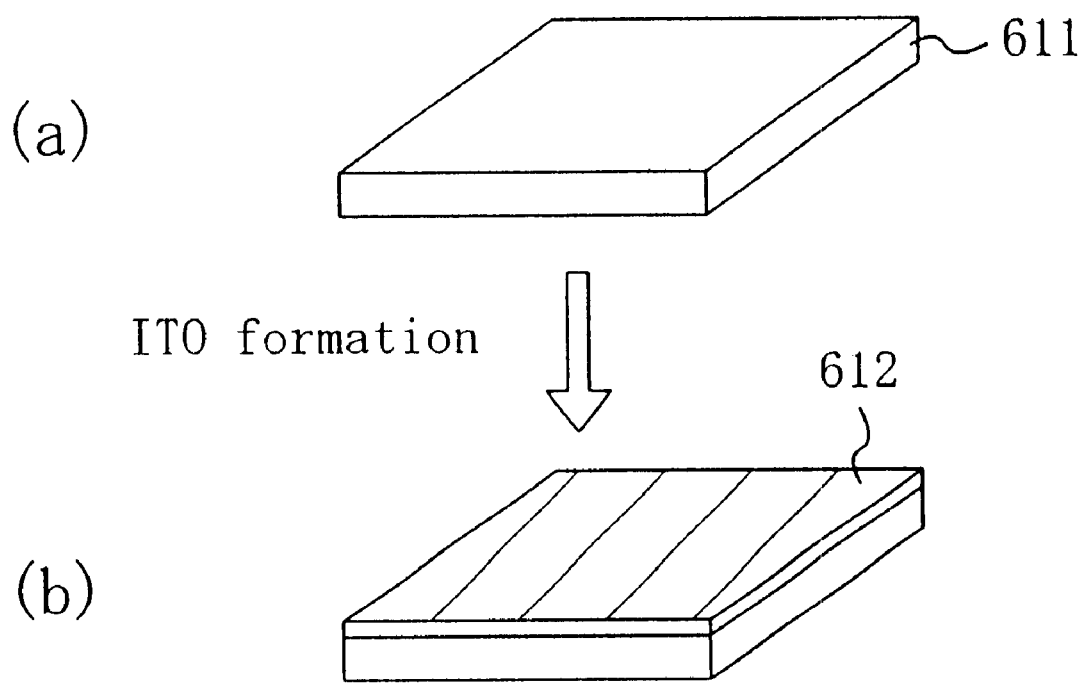
FIG. 27A is a schematic view illustrating steps (a) and (b) of a fabrication method of the liquid crystal display apparatus shown in FIG. 25 according to the present invention.

As shown by steps (a) and (b) of FIG. 27A, ITO is deposited to a thickness of about 50 nm on the glass substrate 611 having a thickness of about 1.1 mm by sputtering, for example, to form the counter electrode 612. An alignment film and a color filter may be formed as required.

Figure 27B:
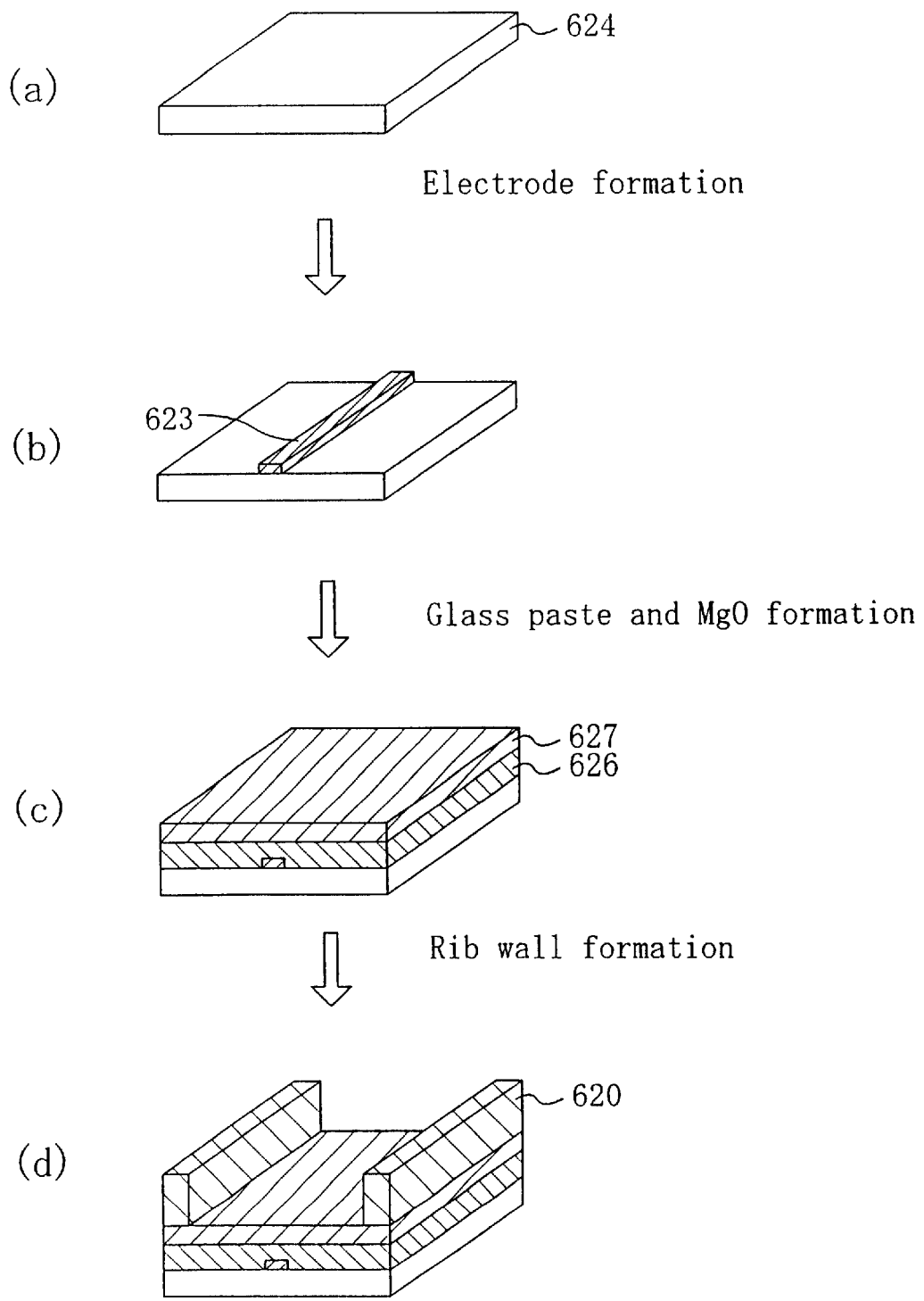
FIG. 27B is a schematic view illustrating steps (a), (b), (c), and (d) of the fabrication method of the liquid crystal display apparatus shown in FIG. 25 according to the present invention.

As shown by steps (a) through (d) of FIG. 27B, nickel, for example, is deposited to a thickness of about 1 µm by sputtering on the glass substrate 624 having a thickness of about 1.1 mm and etched to form the stripe-shaped electrodes 623 (steps (a) and (b) of FIG. 27B). A glass paste is applied to the resultant substrate to a thickness of about 20 µm and baked to form the insulating layer 626. A magnesium oxide layer 627 having a thickness of about 200 nm is then formed on the insulating layer 626 (step (c) of FIG. 27B). The rib walls 620 having a height of about 300 µm are then formed using a glass paste, for example, by screen printing (step (d) of FIG. 27B).

Figure 27C:
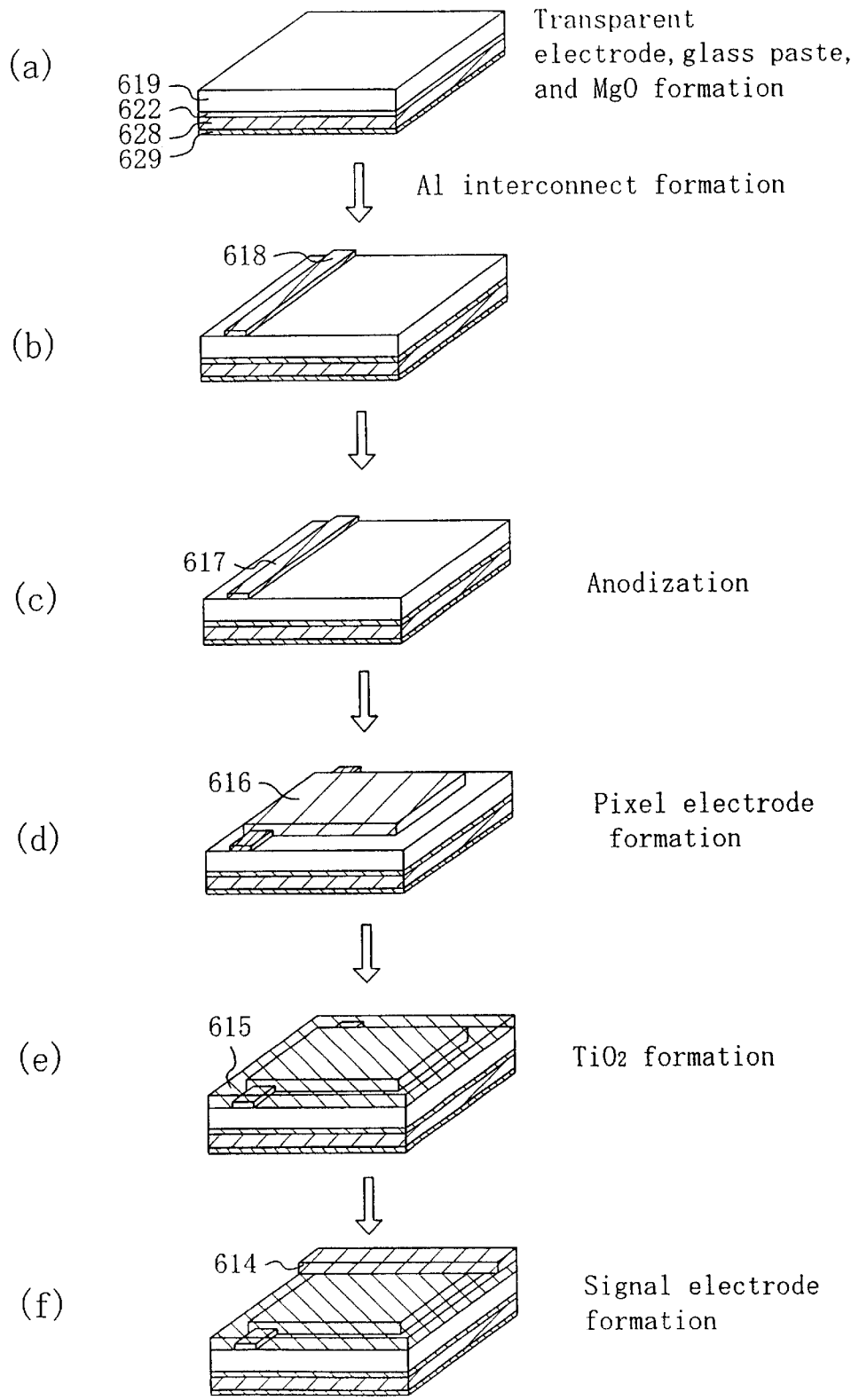
FIG. 27C is a schematic view illustrating steps (a), (b), (c), (d), (e), and (f) of the fabrication method of the liquid crystal display apparatus shown in FIG. 25 according to the present invention.
Figure 27D:
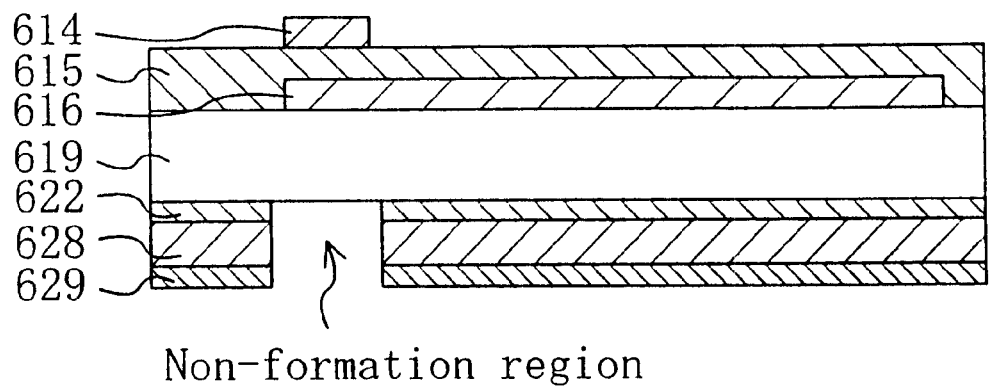
FIG. 27D is a cross-sectional view diagrammatically illustrating a construction of a middle substrate of the liquid crystal display apparatus shown in FIG. 25 according to the present invention.

As shown by steps (a) through (f) of FIG. 27C, first, a transparent conductive layer 622 having a thickness of about 15 nm is formed over the entire surface of the substrate 619 having a thickness of about 0.7 mm by sputtering. Next, a glass paste is applied to the resultant substrate to a thickness of 20 µm and baked to form an insulating layer 628. A magnesium oxide layer 629 having a thickness of about 200 nm is then formed on the insulating film 628 (step (a) of FIG. 27C). In the case of using ultraviolet as addressing light, an ultraviolet transmissive material (e.g., quartz and fused silica) is preferably used as the material of the substrate 619. In addition, as shown in FIG. 27D, non-formation regions where the transparent conductive layer 622, the insulating layer 628, and the magnesium oxide layer 629 are not formed are preferably provided at positions which is to be located under the signal electrodes 614 to be described below.

Thereafter, aluminum is evaporated to a thickness of about 0.1 µm on the opposite surface of the substrate 619, and etched into stripes to form the aluminum interconnects 618 ((step (b) of FIG. 27C). The resultant aluminum interconnects 618 are anodized to form the oxide films (insulating layers) 617 over the surfaces of the respective aluminum interconnects 618 (step (c) of FIG. 27C). A transparent conductive film having a thickness of about 15 nm is formed on the resultant substrate by sputtering and etched into dots to form the pixel electrodes 616 (step (d) of FIG. 27C). The structure of the aluminum interconnect 618/oxide film 617/pixel electrode 616 serves as a storage capacitor.

Titanium oxide is then deposited to a thickness of about 0.1 µm on the resultant substrate by sputtering to form the photoconductive layer 615 (step (e) of FIG. 27C). The stripe-shaped signal electrodes 614 made of aluminum are then formed on the resultant substrate so as to extend perpendicular to the stripes of the aluminum interconnects 618 (step (f) of FIG. 27C). An alignment film may be formed as; required.

Thereafter, the substrate 619 and the substrate 624 are bonded together so that the signal electrodes 614 and the electrode 623 are perpendicular to each other and the electrodes 622 and 623 face each other. After spaces between the rib walls 620 are decompressed, a mixed gas of helium and xenon, for example, is enclosed therein to form the plasma light-emitting channels 621.

Finally, the substrate 611 and the substrate 619 are bonded together so that the counter electrode 612 and the signal electrodes 614 face each other with 5 µm high spacers, for example, interposed therebetween. Nematic liquid crystal material is then injected into the space between the substrates 611 and 619 to form the liquid crystal layer 613, so as to obtain the LCD apparatus 600. Any liquid crystal materials used for conventional active matrix LCD apparatuses can be used for the liquid crystal layer 613. For example, nematic liquid crystal, cholesteric liquid crystal, and the like may be used.

In the LCD apparatus 600, by applying an AC voltage of about 150 V between the electrodes 622 and 623, the mixed gas of helium and xenon is changed to plasma which emits ultraviolet. By applying a driving voltage between the counter electrode 612 and the signal electrode 614 in the state where ultraviolet is emitted, the domain of the liquid crystal layer 613 located above the pixel electrode 616 can be driven.

It is needless to mention that the charge retaining time can be changed by changing the width of the aluminum interconnects 618 and the thickness of the oxide films 617 formed under the pixel electrodes 616, as well as the structure thereof (e.g., silicon nitride may further be formed on the oxide films 617 by sputtering).

The structure and material of the plasma light-emitting channels are not limited to those in the illustrated example. They may be appropriately set depending on the wavelength of emitted light in consideration of the kind and pressure of the gas and the discharge voltage (AC or DC, and voltage value). The insulating layers and the magnesium oxide layers may be omitted.

Embodiment 15

In the case where the size of the optical addressing device and that of the LCD apparatus of EMBODIMENT 14 are large, when the electrode 622 is made of ITO, problems such as a delayed signal voltage and distortion and reduced amplitude of the voltage waveform may occur in some cases, since transparent conductive materials such as ITO have a comparatively low electrical conductivity. In this embodiment, in order to avoid the above problems, a metal electrode is provided so that it is electrically connected with the transparent electrode.

In the LCD apparatus of this embodiment, a metal electrode is formed using aluminum, for example, between the substrate 619 and the electrode 622 of the LCD apparatus 600 of EMBODIMENT 14. Other metal materials having an electrical resistance lower than ITO may also be used.

Figure 28A:
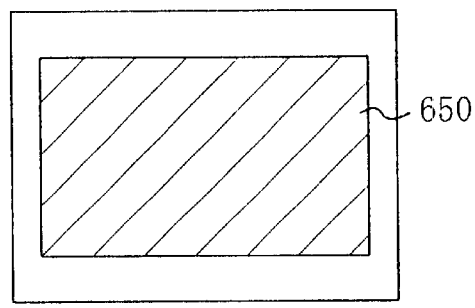
FIGS. 28A, 28B, and 28C are diagrammatic views illustrating an arrangement of metal interconnects of an optical addressing device according to the present invention.
Figure 28B:
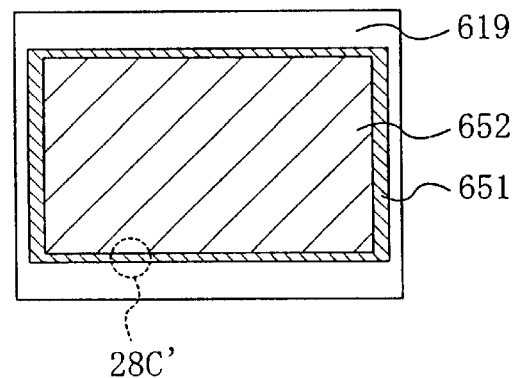
Figure 28C:
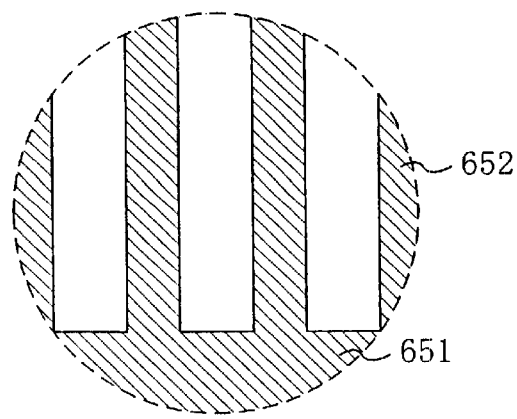

A preferred arrangement of the metal electrode will be described with reference to FIGS. 28A, 28B, and 28C. A region denoted by the reference numeral 650 in FIG. 28A is assumed to be the display region of the LCD apparatus 600. FIG. 28C shows enlarged view of a region 28C' in FIG. 28B. Before or after the transparent electrode 622 is formed on the substrate 619, metal electrodes 651 and 652 as shown in FIG. 28B are formed on the substrate 619. The metal electrode 561 is formed outside the display region 650, while the metal electrode 562 is preferably formed at positions corresponding to the respective rib wall 620 (see FIG. 25) inside the display region 650. In the case of forming a black matrix on the counter substrate (the substrate 611 shown in FIG. 25), the metal electrode 652 is preferably formed to underlie such a black matrix.

Embodiment 16

In this embodiment, stripe-shaped electrodes made of a metal material are formed as electrodes for discharge. The other construction is substantially the same as that of EMBODIMENT 14, and thus detailed description thereof is omitted here.

Figure 29:
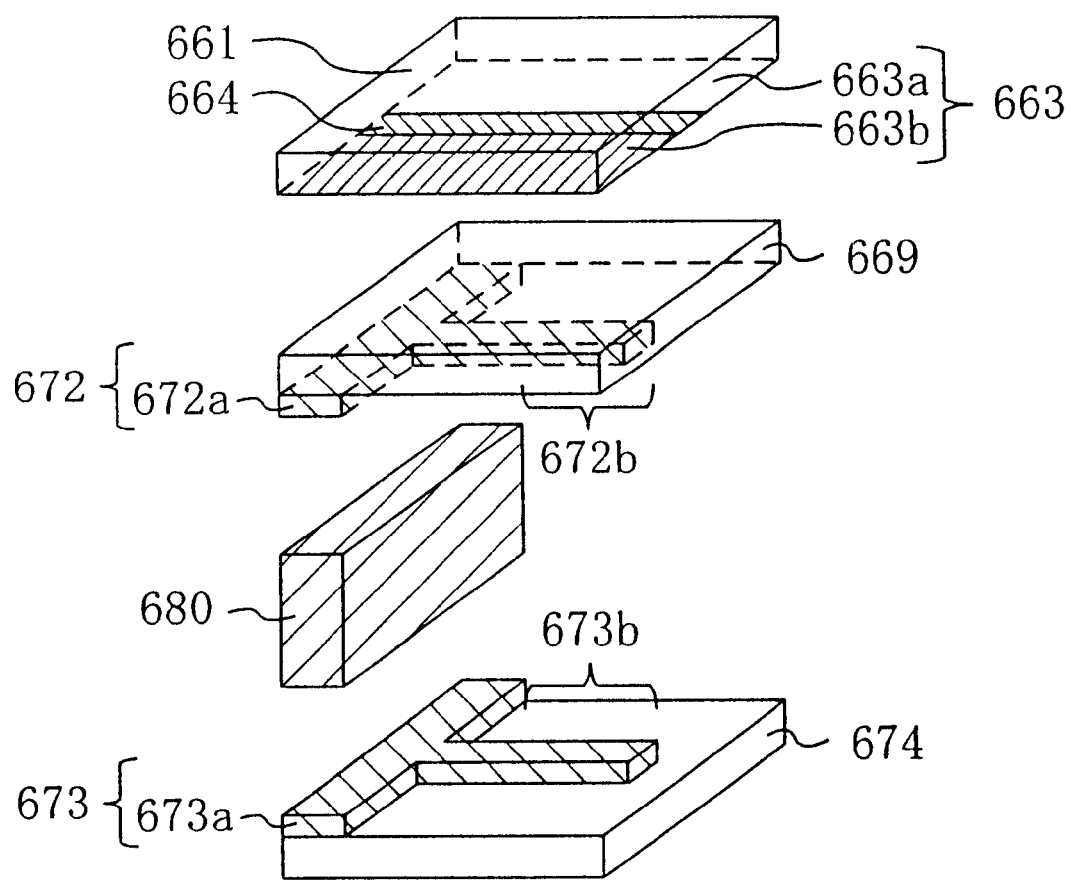
FIG. 29 is a diagrammatic view illustrating an arrangement of metal interconnects of yet another liquid crystal display apparatus according to the present invention.

Referring to FIG. 29, a color filter layer 663 (including a red filter 663a and a green filter 663b, for example) and a black matrix 664 are formed on a substrate 661 (corresponding to the substrate 611 in EMBODIMENT 14). Electrodes 672 (corresponding to the electrodes 622 in EMBODIMENT 14) made of nickel interconnects, for example, are formed on a substrate 669 (corresponding to the substrate 619 of EMBODIMENT 14). Each electrode 672 has a parallel portion 672a and a protrusion 672b, which are formed so as to overlap a rib wall 680 and the black matrix 664, respectively, when viewed from a position normal to the substrate 661. Electrodes 673 (corresponding to the electrodes 623 in EMBODIMENT 14) made of nickel interconnects are formed on a substrate 674 (corresponding to the substrate 624 of EMBODIMENT 14). Each electrode 673 has a parallel portion 673a and a protrusion 673b, which are formed so as to overlap the rib wall 680 and the black matrix 664, respectively, when viewed from a position normal to the substrate 661. The glass paste and the magnesium oxide layer are omitted in this embodiment. In this way, by overlapping at least part of the electrodes 672 and 673 for plasma discharge with the rib wall 680 and the black matrix 664, reduction in the aperture ratio of the LCD apparatus due to the electrodes for plasma discharge is suppressed. The protrusions of the electrodes are not necessarily formed under the entire black matrix. Modifications are possible depending on the construction of the apparatus. For example, the protrusions may be formed only along the sides of each set composed of red, green, and blue color filters. In the optical addressing device of this embodiment, plasma light emission can be triggered by applying a 200 V DC (pulse) voltage, for example, between the electrodes 672 and 673.

In the construction of the above embodiments where the pixel electrodes made of a transparent conductive material (e.g., the pixel electrodes 216 in FIG. 2) are formed, such pixel electrodes can be omitted. For example, if the pixel electrodes 216 are omitted from the LCD apparatus 200 of FIG. 2, the photoconductive layer 215 can serve as pixel electrodes. The photoconductive layer 215 made of titanium oxide, for example, having a sensitivity to ultraviolet transmits visible Light, and also has an electrical conductivity when it is irradiated with ultraviolet emitted from the plasma light-emitting channels. In other words, during the irradiation with ultraviolet for addressing, the photoconductive layer 215 serves as a transparent pixel electrode. After the addressing light is terminated, the photoconductive layer 215 serves as an insulator. If the photoconductive layer 215 has a sufficient electrical conductivity enabling a charge input from the signal electrode 214 during the period when the photoconductive layer 215 is irradiated with the addressing light to be dispersed in uniform within the region of the photoconductive layer 215 corresponding to the pixel region, the photoconductive layer 215 as an insulator can accumulate and retain the charge corresponding to the signal voltage within the plane thereof.

The above construction is applicable to, not only the LCD apparatus 200 shown in FIG. 2, but also the LCD apparatus 300 shown in FIG. 6A. Also, instead of the pixel electrodes 356 and 366 shown in FIGS. 11A and 12A, respectively, the photoconductive layers 355 and 365 can be made to serve as the pixel electrodes by enlarging them to the size of the pixel electrodes 356 and 366.

Thus, since the formation of the pixel electrodes can be omitted by using the photoconductive layer as the pixel electrodes, production cost is further reduced.

As described above, according to the present invention, a novel optical addressing device and a liquid crystal display apparatus of a new type using the novel optical addressing device are provided. Since formation of active elements such as TFTs is not required, the liquid crystal display apparatus according to the present invention can be fabricated at a high yield and comparatively low cost. Moreover, since light addressing is realized, an extremely thin (about 50 μm) dielectric separator is not required unlike the conventional PALC, the liquid crystal display apparatus according to the present invention can be fabricated at a high yield and comparatively low cost and be driven at a low voltage compared with the conventional PALC.

One of the electrodes for discharge for each plasma light-emitting channel of the optical addressing device according to the present invention is composed of a transparent electrode formed on the entire surface of the plasma light-emitting channel. This suppresses reduction in the aperture ratio due to the electrodes for discharge. Another optical addressing device according to the present invention uses a pair of stripe-shaped electrodes for discharge. At least part of such stripe-shaped electrodes is formed so as to overlap the rib walls and the black matrix or outside the display region, suppressing reduction in the aperture ratio due to the electrodes for discharge.

When a backlight is disposed in a transmission type display device according to the present invention, an ultraviolet absorption layer (e.g., a film made of a polymer) may be additionally provided as required. In the liquid crystal display apparatus according to the present invention, the structure of the liquid crystal layer is not limited, but any known liquid crystal (e.g., host-guest type liquid crystal, cholesteric liquid crystal, and polymer dispersed liquid crystal) can be used.

While the present invention has been described in preferred embodiments, it will be apparent to those skilled in the art that the disclosed invention may be modified in numerous ways and may assume many embodiments other than those specifically set: out and described above. Accordingly, it is intended by the appended claims to cover all modifications of the invention which fall within the true spirit and scope of the invention.

What is claimed is:

1. A liquid crystal display apparatus comprising:
   a first substrate;
   a second substrate;
   a liquid crystal layer sandwiched by the first substrate and the second substrate;
   a first electrode layer formed on a surface of the first substrate facing the liquid crystal layer;
   a second electrode layer formed on a surface of the second substrate facing the liquid crystal layer;
   a third electrode layer electrically connected with the second electrode layer via a photoconductive layer; and
   a plurality of stripe-shaped light sources disposed outside the second substrate for irradiating at least a portion of the photoconductive layer with light,
      wherein the electrical conductivity of the photoconductive layer is changed by switching the plurality of light sources to switch electrical connection between the second electrode layer and the third electrode layer and thereby to realize optical addressing of the liquid crystal layer.

2. The liquid crystal display apparatus of claim 1, wherein the first electrode layer comprises a single first electrode,
   the second electrode layer, the photoconductive layer, and the third electrode layer are formed on the surface of the second substrate facing the liquid crystal layer in this order,
   the second electrode layer comprises a plurality of pixel electrodes arranged in a matrix,
   the third electrode layer comprises a plurality of stripe-shaped single electrodes extending in parallel with one another in a first direction, and
   the plurality of light sources are stripe-shaped light sources extending in parallel with one another in a second direction which is different from the first direction.

3. The liquid crystal display apparatus of claim 2, wherein the photoconductive layer comprises at least one dot-shaped photoconductive film arranged for each of the plurality of pixel electrodes.

4. The liquid crystal display apparatus of claim 2, further comprising a storage capacitor electrically connected with each of the pixel electrodes.

5. The liquid crystal display apparatus of claim 2, wherein the first electrode comprises a transparent conductive layer, the first electrode further comprising a metal electrode electrically connected with the transparent conductive layer.

6. The liquid crystal display apparatus of claim 2, wherein the photoconductive layer includes a substance of which electrical conductivity changes in response to ultraviolet light to allow for display in a transmission mode or a reflection mode.

7. The liquid crystal display apparatus of claim 2, wherein the photoconductive layer includes a substance of which electrical conductivity changes in response to visible light to allow for display in a transmission mode or a reflection mode.

8. The liquid crystal display apparatus of claim 2, wherein the photoconductive layer comprises a single photoconductive film.

9. The liquid crystal display apparatus of claim 2, wherein the photoconductive layer comprises the plurality of stripe-shaped photoconductive films extending in parallel with a plurality of stripe-shaped signal electrodes.

10. The liquid crystal display apparatus of claim 2, wherein the plurality of light sources comprise plasma light-emitting channels enclosing ionizable gas therein.

11. The liquid crystal display apparatus of claim 10, wherein the plurality of light sources further include a phosphor which changes ultraviolet light emitted from the plasma light-emitting channels to visible light.

12. The liquid crystal display apparatus of claim 1, wherein the first electrode layer comprises a plurality of stripe-shaped first electrodes extending in parallel with one another in a first direction, the second electrode layer, the photoconductive layer, and the third electrode layer are formed on the surface of the second substrate facing the liquid crystal layer in this order, the second electrode layer comprises a plurality of pixel electrodes arranged in a matrix, or a plurality of stripe-shaped second electrodes extending in parallel with one another in a second direction which is different from the first direction, the third electrode layer comprises a plurality of stripe-shaped signal electrodes extending in parallel with one another in the second direction, and the plurality of light sources are stripe-shaped light sources extending in parallel with one another in the second direction.

13. The liquid crystal display apparatus of claim 12, wherein the photoconductive layer comprises at least one dot-shaped photoconductive film arranged for each of the plurality of pixel electrodes.

14. The liquid crystal display apparatus of claim 12, further comprising a storage capacitor electrically connected with each of the pixel electrodes.

15. The liquid crystal display apparatus of claim 12, wherein the first electrode comprises a transparent conductive layer, the first electrode further comprising a metal electrode electrically connected with the transparent conductive layer.

16. The liquid crystal display apparatus of claim 12, wherein the photoconductive layer includes a substance of which electrical conductivity changes in response to ultraviolet light to allow for display in a transmission mode or a reflection mode.

17. The liquid crystal display apparatus of claim 12, wherein the photoconductive layer includes a substance of which electrical conductivity changes in response to visible light to allow for display in a transmission mode or a reflection mode.

18. The liquid crystal display apparatus of claim 12, wherein the photoconductive layer comprises a single photoconductive film.

19. The liquid crystal display apparatus of claim 12, wherein the photoconductive layer comprises a plurality of stripe-shaped photoconductive films extending in parallel with the plurality of stripe-shaped signal electrodes.

20. The liquid crystal display apparatus of claim 12, wherein the plurality of light sources comprise plasma light-emitting channels enclosing ionizable gas therein.

21. The liquid crystal display apparatus of claim 20, wherein the plurality of light sources further include a phosphor which changes ultraviolet light emitted from the plasma light-emitting channels to visible light.

* * * * *

UNITED STATES PATENT AND TRADEMARK OFFICE
CERTIFICATE OF CORRECTION

PATENT NO.    : 6,310,665 B1
DATED         : October 30, 2001
INVENTOR(S)   : Kido It is certified that error appears in the above-identified patent and that said Letters Patent is hereby corrected as shown below:

<u>Title page,</u>
Item [56], should also include:

-- 4,896,149    1/1990  Buzak et al. ............   340/794

FOREIGN PATENT DOCUMENTS

| | | |
|---|---|---|
| 4356024 | 12/1992 | Japan |
| 5134613 | 4/1993  | Japan |
| 5158065 | 6/1993  | Japan |
| 1082994 | 3/1998  | Japan |
| 9724907 | 7/1997  | WIPO -- |

Signed and Sealed this

Tenth Day of September, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,310,665 B1
DATED : October 30, 2001
INVENTOR(S) : Kido

It is certified that error appears in the above-identified patent and that said Letters Patent is hereby corrected as shown below:

Column 34,
Line 58, change "single" to -- signal --.

Column 35,
Line 22, change "the" to -- a --;
Line 23, change "a" to -- the --.

Signed and Sealed this

Twenty-sixth Day of November, 2002

Attest:

JAMES E. ROGAN
Attesting Officer  Director of the United States Patent and Trademark Office